(12) United States Patent
Kohmura et al.

(10) Patent No.: US 6,474,154 B2
(45) Date of Patent: Nov. 5, 2002

(54) FLOW MEASUREMENT DEVICE FOR MEASURING FLOW RATE AND FLOW VELOCITY

(75) Inventors: Yoshihiko Kohmura, Aichi (JP); Shunsuke Maeda, Aichi (JP); Takio Kojima, Aichi (JP); Yasuhisa Kuzuya, Aichi (JP); Masanori Suda, Aichi (JP); Takafumi Oshima, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/754,343

(22) Filed: Jan. 5, 2001

(65) Prior Publication Data

US 2002/0129648 A1 Sep. 19, 2002

(51) Int. Cl.[7] .................................................. G01F 5/00
(52) U.S. Cl. ........................................................ 73/202
(58) Field of Search .............................. 73/202.5, 118.2, 73/204, 204.21, 204.26, 861.25, 204.22

(56) References Cited

U.S. PATENT DOCUMENTS

| | | | |
|---|---|---|---|
| 4,317,365 A | | 3/1982 | Lauterbach |
| 4,403,506 A | | 9/1983 | Lauterbach |
| 4,856,328 A | * | 8/1989 | Johnson ........................ 73/202 |
| 4,955,230 A | | 9/1990 | Hall |
| 5,167,147 A | | 12/1992 | Peters et al. |
| 5,404,753 A | | 4/1995 | Hecht et al. |
| 5,467,648 A | * | 11/1995 | Igarashi et al. ............ 73/202.5 |
| 5,537,870 A | * | 7/1996 | Zurek et al. .................... 73/202 |
| 5,693,879 A | | 12/1997 | Rilling et al. |
| 5,804,718 A | * | 9/1998 | Nagasaka et al. .............. 73/202 |
| 5,867,884 A | | 2/1999 | Rilling et al. |
| 5,942,683 A | * | 8/1999 | Aoi et al. ................... 73/202.5 |
| 5,948,975 A | | 9/1999 | Mueller et al. |
| 5,969,263 A | * | 10/1999 | Ligneul et al. .......... 73/861.25 |

FOREIGN PATENT DOCUMENTS

| | | |
|---|---|---|
| DE | 198 00 573 | 7/1999 |
| EP | 1 091 195 | 4/2001 |
| JP | 7-5007 | 1/1995 |
| JP | 9-503311 | 3/1997 |
| WO | WO 92/21940 | 12/1992 |

* cited by examiner

Primary Examiner—Benjamin R. Fuller
Assistant Examiner—Jewel V. Thompson
(74) Attorney, Agent, or Firm—Sughrue Mion, PLLC

(57) ABSTRACT

A flow rate and flow velocity measurement device. A part of a flow 10 in a main flow pipe 1, which is a detection object, is introduced into a passage of a divided flow pipe 2 and becomes a flow 11. The divided flow pipe 2 has a curved portion 2c or rather an inverted arc portion in which the flow is abruptly changed in direction or rather inverted by protuberances 2a, 2b formed preferably in symmetry in upstream and downstream sides of the curved portion 2c. Outside the main flow pipe 1, there is disposed on the bottom portion of the curved portion 2c of the divided flow pipe 2 a detection element 5 fixed to a support body 4 while protruding preferably 0.05–0.3 mm from flow passage faces 2e, 2f in the vicinity thereof. An opposed face 2d opposite to the detection element 5 protrudes toward the detection face so as to throttle the passage and to accelerate a flow speed at the element. Thus, in the curved portion 2c from the flow 11, a down flow 12 is constantly formed obliquely impinging against the detection face of the detection element 5, improving flow measurement accuracy within a wide flow speed range.

32 Claims, 15 Drawing Sheets

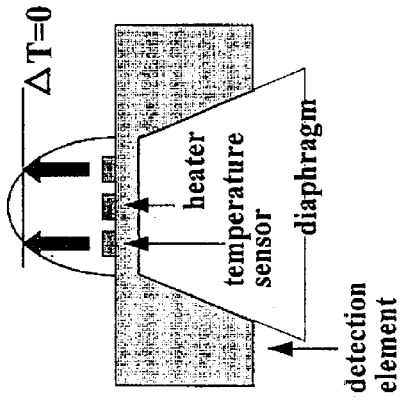
Fig.3(A) v=0
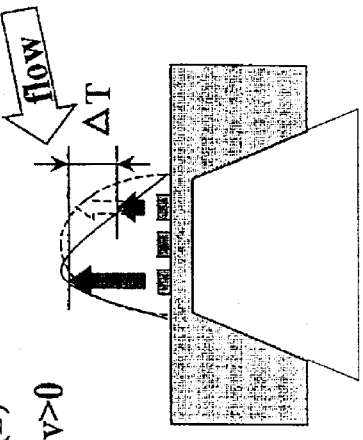
Fig.3(B) v>0
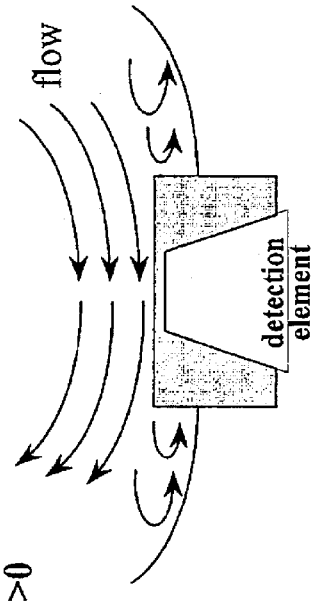
Fig.16(A) H>0
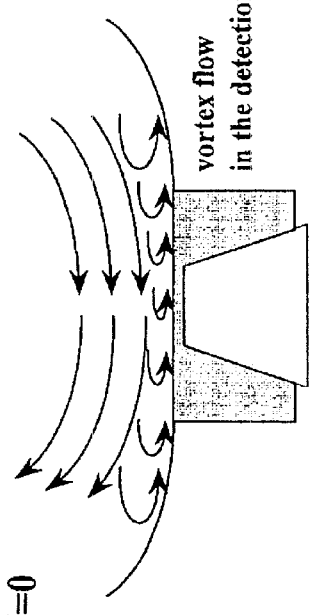
Fig.16(B) H=0
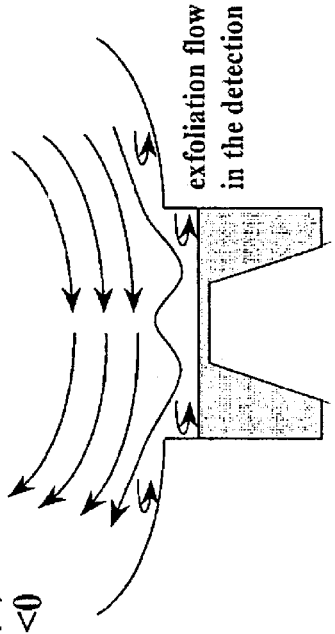
Fig.16(C) H<0

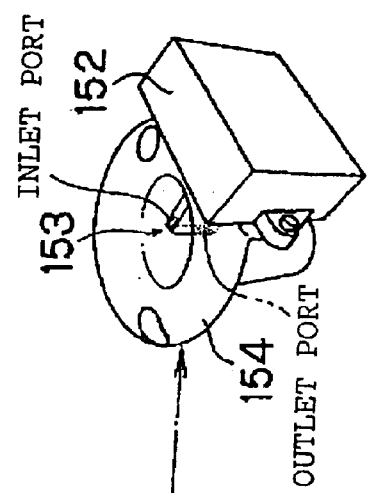
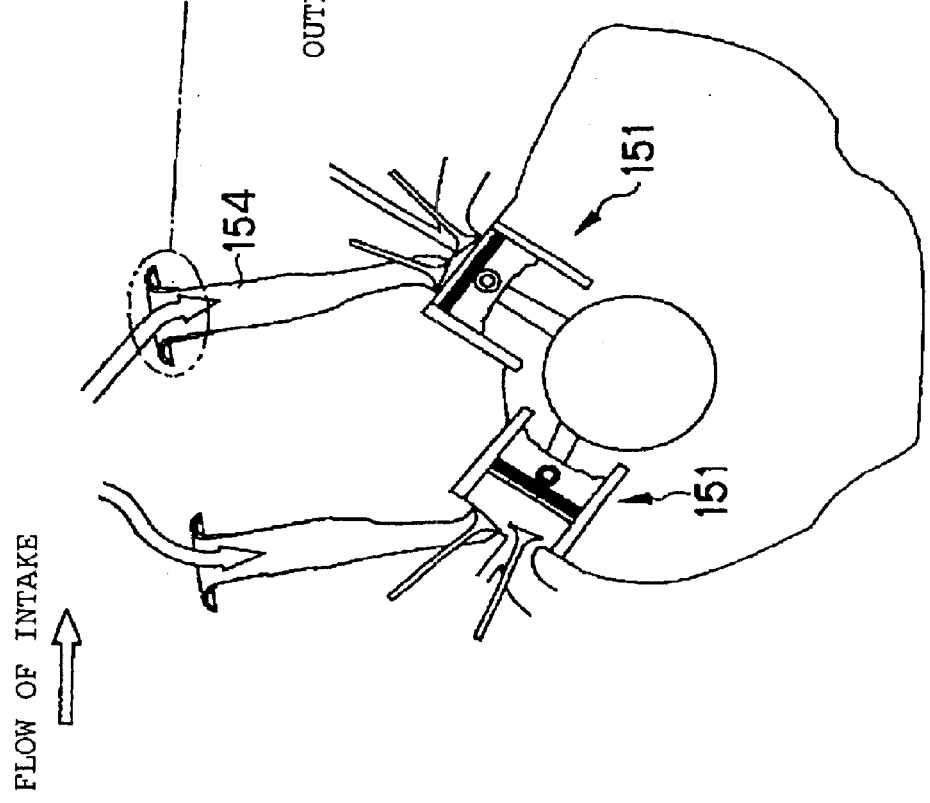
Fig. 15 (A)   Fig. 15 (B)

FLOW MEASUREMENT DEVICE FOR MEASURING FLOW RATE AND FLOW VELOCITY

BACKGROUND OF THE INVENTION

1. Field of the Invention

The present invention relates to a device for measuring various quantities concerning a flow, among others, relates to a flow rate and flow velocity measurement device using a detection element integrally formed on a support body and/or a temperature sensitive semiconductor chip, and relates to a measurement device suitably applied, for example, as a combustion controlling mass flow rate sensor of an engine for a vehicle or industry, or a mass flow rate sensor for an industrial air conditioning system and compressor pressurized air supply system and, furthermore, an air/fuel ratio controlling flow rate sensor of a domestic gas hotplate.

2. Description of the Related Art

Japanese patent application laid-open No. 9-503311 proposes "A sensor support body for a device measuring an intake of internal combustion engine, provided with a sensor support body and a sensor element on a plate inserted into a flow rate medium, wherein the sensor element has at least one measurement resistor concerned with temperature, and the sensor element is accommodated in a notch of the sensor support body while forming approximately the same face as the sensor support body". Further, in an embodiment of the same gazette "The sensor element has a plate-like shape, and its largest surface is lined up parallel to an inflowing medium".

The same Japanese patent application laid-open No. 9-503311 recites that "When manufacturing the device, it is important to bond a surface of the sensor element into the notch such that it becomes, as far as possible, the same face as a surface of the sensor support body. This is because even if a smallest displacement owing, for example, to a bonding layer unevenly applied exists, it follows that a vortex flow and exfoliation region is generated, and the vortex flow and exfoliation region exerts an adverse effect on a heat extraction of the measurement resistor especially at the surface of the sensor element, so that a measurement result becomes erroneous".

However, in order to "bond a surface of the sensor element into the notch such that it becomes, as far as possible, the same face as a surface of the sensor support body" as proposed in Japanese patent application laid-open No. 9-503311, there is a problem in that a high and precise manufacturing technique is required and manufacturing efficiency is thereby decreased.

Further, in order to assure that the surface of the sensor element is the same face as the surface of the sensor support body, a further problem arises in that a precise inspection is necessary.

SUMMARY OF THE INVENTION

It is therefore an object of the invention to provide a flow measurement device, which is easy to manufacture and has excellent detection accuracy.

A flow measurement device of a first aspect of the invention has means, provided so as to act on a flow in a divided flow pipe, for forming such a flow as to obliquely impinge against a detection face of a flow-detection element, as schematically shown in FIG. 1(A) wherein a flow 12 is shown by a upper arrow slanting against the detection element face. In order to obliquely impinge the flow against the detection element, a flow passage or inner diameter of the divided flow pipe is reduced so as to form a passage-narrowest portion and in addition the pipe is bent at the passage-narrowest portion so as to form a inverted arc whereat the detection element is placed. In this structure, a flow speed maximizes at the passage-narrowest portion and a flow of an object such as a gas impinges obliquely on the element. A better performance of the flow measurement device is attained when an upstream flow passage and a downstream passage along the inverted arc wherein the detection element is placed in a middle is shaped in symmetry along the inverted arc, according to one of the aspects of the invention.

It is considered that, by this flow control means, a flow to be detected is constantly supplied to the detection face of the detection element and it follows that the flow to be detected surely flows on the detection face. In addition, it is considered as an advantage that generation of a vortex flow and exfoliation in the vicinity of the detection face are suppressed so that flow detection accuracy and flow detection reproducibility are improved.

Further, since it is considered that, in this measurement device, the flow on the detection face is stabilized, the detection face is not necessarily positioned on the same face as a flow passage face on both sides of the detection portion. In other words, this measurement device allows a step between the detection face and the flow passage face in the vicinity of the detection portion and, further, enlarges an allowable width in relative positional accuracy of the detection- element detection face with respect to the flow passage face.

Therefore, according to the measurement device of the first preferred aspect of the invention, it becomes unnecessary to bond the detection element into a notch of its support body with a lot of care, as required in Japanese patent application laid-open No. 9-503311 wherein the detection element surface and the support body surface is strictly on the same face without a step therebetween. That is, this measurement device allows forming such a step between the detection face and the flow passage face on both sides of the detection portion, which step is easily generated as an error. As a result, manufacture of the device is easy, and accuracy in dimensional and/or positional inspection of the element in the flow measurement device can be lowered without lowering the performance of the flow measurement device.

In this manner, since the flow measurement device of the first preferred aspect of the invention allows such a step mentioned above, it becomes possible to attach the detection element so as to be detachable from the divided flow pipe fixed to a main flow pipe by constituting the detection element and its support body as separate bodies or by constituting the detection element and its support body as bodies separate from the divided flow pipe. As a result, it is possible to exchange the detection element if the element has been deteriorated or contaminated by long term use.

Here, effects derived from the flow measurement device of the first important aspect of the invention are exemplified below.

(1) By forming a flow (or rather a down flow) obliquely impinging toward the detection face of the detection element according to the invention, generation of a vortex flow and exfoliation are suppressed in the vicinity of the detection face and, as a result, it is possible to obtain a stable detection property and reproducibility.

(2) Even if the detection face is not at the same level as the detection element support body surface, detection is possible. As a result, assembly of the detection element becomes easy.

(3) Because a down flow is formed, an accurate and stable detection of quantities concerning the flow, e.g., flow rate and flow velocity, becomes possible at a flow passage wall. In this case, it suffices if only a detection element surface or the detection face is exposed inside the flow passage.

(4) Since the detection of the flow rate and flow velocity at the flow passage wall is possible with a rough positional accuracy of the detection element, the detection element and the divided flow pipe can be made separate bodies, so that structures of the detection element and the divided flow pipe are respectively simplified and become easy to manufacture.

(5) It is possible to constitute a flow passage shape of the divided flow pipe in compliance with a requirement for measuring both a normal flow and a reverse flow, or either the normal flow and the reverse flow is selectively measured so as not to be influenced by the other flow, by forming the flow passage in symmetry between upstream and downstream sides with the detection element placed therebetween.

(6) Since another divided flow passage can be formed in the divided flow pipe, improvements in contamination resistance and mechanical handling property are expected.

A flow measurement device of a second aspect of the invention has a detection element which is more exposed to the flow in the divided flow pipe at a wall portion or a pipe wall of the divided flow pipe and detects a flow quantity, and means provided in the divided flow pipe for forming a flow that obliquely impinges the detection face of the detection element. According to this measurement device, the detection element and the divided flow pipe can be made as separate bodies, so that structures of the detection element and the divided flow pipe are respectively simplified and become easy to manufacture.

A flow measurement device of a third aspect of the invention has a detection element which is disposed in a portion which, in the divided flow pipe, protrudes from the main flow pipe, and detects a flow quantity. According to this measurement device, an assembly of the detection element is made easy and, further, a degree of freedom in design of the main flow pipe and its outside vicinity is improved.

In a measurement device of a fourth aspect of the invention, the detection face of the detection element protrudes from an adjoining flow passage face or from a detection element support body surface. This protrusion further improves the previously described effects, and best improves them with the following optimization linked with a fifth aspect of the invention.

In a flow measurement device according to a fifth aspect of the invention, the detection face of the element protrudes 0.05 mm to 0.3 mm from a level of an adjoining inverted arc wall face of the flow passage or the detection element support body. This protrusion range of 0.05–0.3 optimizes the effects previously described when the first and fifth aspects are combined; the reason is illustratively understood by referring to FIG. 16(A), FIG. 16(B) and FIG. 16(C). When the detection element protrudes by a protruded height (H>0) as shown in FIG. 16(A), a vortex or exfoliation flow that appears along or in the detection element face is greatly reduced or substantially eliminated under the obliquely impinging flow, compared to the element face formed at the same flat level (H=0) or at a lower recessed level (H<0) with the adjoining inverted arc wall face formed on the support body or the divided flow pipe.

In a flow measurement device of a sixth aspect of the invention, a detection element is disposed such that the flow in a measurement object pipe (main flow pipe) is taken into a detection pipe (divided flow pipe), the flow taken into the detection pipe is abruptly changed in direction, or rather the flow is inverted at a flow-direction inverting portion formed in the detection pipe so that the flow taken into the detection pipe obliquely impinges a surface of the detection element placed substantially at the middle or bottom of the direction-inverting portion or at the downstream side including the vicinity of the downstream side of the detection element.

A flow measurement device of a seventh aspect of the invention has a divided flow pipe forming an opening or window at the direction-inverting portion of the divided flow pipe wall, and a detection element support body including a circuit board for driving or controlling the detection element and detachable from the divided flow pipe is incorporated at the opening. The detection element is disposed in the opening so that the face of the detection element protrudes 0.05–0.3 mm from an edge of the opening.

Preferred implementation modes of the invention are explained below.

In a preferred implementation mode of the invention, at the inverted or curved portion of the divided flow pipe (detection pipe), the detection face of the detection element is exposed inside the divided flow pipe. More preferably, a curved pipe (divided flow pipe) is attached in a direction orthogonal to the main flow pipe for measuring an object such as a gas, and the detection element (detection portion) is provided in such a curved portion (folded or inverted portion where a flow passage is curved) of the curved pipe. Alternatively, the detection element or detection portion is disposed in a portion where the flow in the divided flow pipe is inverted or a direction of the flow is sharply changed or in downstream position of the inverted portion including downstream vicinity thereof. Further most preferably, the detection face of the element is exposed to a portion where the flow in the divided flow pipe is fastest in its flow speed. In other words, the detection face is exposed to a portion where the flow is throttled in the divided flow pipe and in addition the flow is changed in its direction. The speed of the flow becomes highest where the divided passage defined by the divided pipe wall is narrowest and inverted. The speed of the flow turning outside is higher than that of the flow turning inside.

In another preferred implementation mode of the invention, in order to generate a flow (down flow) obliquely impinging against the detection face, the detection element is disposed in the curved portion of the flow passage where a flowing object such as gas inverts its flow direction with its highest or rather fastest speed. Since the direction of flow is necessarily changed in the curved portion, it is easy to constantly obtain the down flow obliquely impinging on the detection element. Further, in the case that the curved portion or the flow passage face in at least an upstream side of the curved portion includes a concave curved face or a convex curved face or slant face extending toward the detection portion, it is further effective for generating such down flow.

In another preferred implementation mode of the invention, from the flow introduced into a divided flow passage in the divided flow pipe, the down flow for the detection face is constantly formed by protuberances and the curved portion.

In another preferred implementation mode of the invention, a separator (partition wall) is provided in a center of the detection pipe (constituting the divided flow pipe), and the flow introduced into the detection pipe is inverted or sharply changed in its direction by the separator.

In another preferred implementation mode of the invention, as flow control means for forming a flow (down flow) obliquely impinging against the detection face of the detection element or a flow flowing obliquely with respect to the detection face, a flow passage face is present protruding at least as far as the detection face in at least an upstream or an upstream and/or a downstream of the detection element.

As the protrusion form, one capable of forming the flow obliquely impinging against the detection face suffices and, preferably, it protrudes concavely or covexly, or the protrusion surface is made into a linear, polygonal or concavely curved slant face.

In another implementation mode of the invention, a difference (H) between a height of the detection face of the detection element and a height of the flow passage face in the vicinity of the detection face along the flow direction, i.e., a step, is made ±0.5 mm or below, further preferably ±0.4 mm or below, and more preferably ±0.3 mm or below. The plus is a case where the detection face is higher, and the minus a case where it is lower. The difference (H) is determined based on an angle of the down flow. A reliable performance of the flow measurement device is attained when the detection face protrudes from the level of the flow passage inner face in a vicinity of the detection face, and such a step described above is made within a range of 0.05 to 0.5 mm, preferably a range of 0.05 to 0.4 mm (50–400 $\mu$m), or most preferably a range of 0.05 to 0.3 mm, when a surface undulation determined by average depth of the undulation of the detection element face is as small as or less than 2 $\mu$m.

Especially, in a boundary region between the protuberance and the detection portion (region where the detection element exists), a structure in which the detection face is present in a side of the protuberance flow passage face is advantageous in preventing the vortex flow from occurring in the detection face. The structure is designed so as to minimize the vortex flow in the detection face with consideration of a flow angle by which the flow obliquely impinges on the detection element.

Further, in the boundary region, by providing a gap between the protuberance flow passage face and the detection portion, it becomes possible to effectively confine a turbulent flow within the gap.

In another preferred implementation mode of the invention, the curved portion of the divided flow pipe constitutes a part of a Venturi tube.

In another preferred implementation mode of the invention, as a support body of the detection element, a plate containing a circuit board or a circuit is used. Additionally, in a back face of the circuit board or a face on which no parts of the circuit are mounted, by forming or supporting the detection element under a state that it protrudes beyond a circuit board face, an assembly of the detection element to the flow passage or the divided flow pipe becomes easy. This brings about an advantage in that a printed wiring is applied to the back face of a usual mounted circuit board and the detection element can be installed to a predetermined position on the board while being protruded. Therefore, manufacture becomes easy without using such a high level manufacturing technique. The detection element is so bonded between circuit parts disposed in high density that the detection face of the detection element is positioned strictly on the same plane as the circuit board face.

In another preferred implementation mode of the invention, it is possible to use the detection element while being mounted on the detection element support body or a circuit board support body. The detection element support body and the circuit board support body are not necessarily exposed together with the detection element to an inside of the flow passage, and rather can be positioned in a divided flow pipe outside space separated by the flow passage wall or the protuberance of the divided flow pipe. According to this form, exchange of the detection element is easy. Preferably, the divided flow pipe has a seal portion for sealing a gap between the divided flow pipe and the detection element or the support body of the detection element.

In another preferred implementation mode of the invention, the detection element and the divided flow pipe are made separate bodies, and the detection element is attached to the divided flow pipe so as to be detachable therefrom. Further preferably, the divided flow pipe and the circuit board support body for holding the detection element are made separate bodies and, at a measurement time, they are used by being mutually assembled. It is also possible to directly bond the detection element to the circuit board support body, and a concave to some extent may be provided in this support body in order to align a position.

In another preferred implementation mode of the invention, the detection element is disposed in a flow wall or the pipe wall in the divided flow pipe and, among others, in an outer wall. As occasion demands, the detection element is disposed in the flow within the divided flow pipe.

In another preferred implementation mode of the invention, the detection element is installed such that it is exposed inside a divided flow passage bypassed from a main flow passage, or inside a further divided flow passage of the divided flow passage bypassed from the main flow passage.

In another preferred implementation mode of the invention, a stagnant portion is formed in the vicinity of an inlet port and/or an outlet port of the divided flow pipe. In this manner, contamination of the detection element by fine particles and dust, etc., is prevented in high degree.

In another preferred implementation mode of the invention, a reduced diameter portion is formed in the upstream portion of the divided flow pipe. In this manner, contamination of the detection element by fine particles and dust, etc., is prevented in high degree. Further, according to the measurement device having in the downstream portion of the divided flow pipe an increased diameter portion along a normal flow direction extending from the inlet port to the outlet port, in other words, a reduced diameter portion along a reverse direction extending from the outlet port to the inlet port, an influence of the reverse flow at a normal flow measurement time is suppressed.

In another preferred implementation mode of the invention, the flow passages in the upstream side and the downstream side of the detection element are basically formed symmetrically with the detection element being made a center. According to such a device, it is possible to suitably measure both the normal flow basically flowing from the inlet port to the outlet port and the reverse flow basically flowing in its reverse direction.

In another preferred implementation mode of the invention, a sectional shape cut along a direction orthogonal to the flow direction in the divided flow pipe is any one or more of shape(s) selected from circular, semi-circular, elliptic and rectangular shapes.

In another preferred implementation mode of the invention, the detection element measures a quantity concerning a flow, at least including a flow rate and/or a flow velocity, based on temperature.

BRIEF DESCRIPTION OF THE DRAWINGS

FIG. 3(A) and FIG. 3(B) are explanatory views of a measurement principle of the detection element used in the device of the embodiment 1 of the invention, wherein FIG. 3(A) is an isothermal line view showing a temperature distribution when a flow velocity is zero and temperature difference (ΔT) detected by two temperature sensors sandwiching a heater forming a diaphragm detection element, and FIG. 3(B) is another isothermal line view showing another temperature distribution when a down flow impinges on the detection element face so that the temperature difference (ΔT) appears between the two temperature sensors;

FIG. 14 is a view for explaining an Application Example 1 of the measurement device according to the invention, wherein FIG. 14(A) is a total view, and FIG. 14(B) an enlarged view of a portion in which the measurement device has been installed.; and FIG. 15 is a view for explaining an Application Example 2 of the measurement device according to the invention, wherein (A) is a total view, and (B) an enlarged view of a portion in which the measurement device has been installed.

FIGS. 16(A)–(C) are explanatory views showing by arrows where vortex flows and/or exfoliation flows are formed in a detection face of the element by a main down stream flow, wherein FIG. 16(A) shows that a detection element protruding higher than its vicinity face, FIG. 16(B) shows a detection element at the same level as the vicinity face, and FIG. 16(C) shows a detection element at a lower level compared to the vicinity face.

Figure 1:
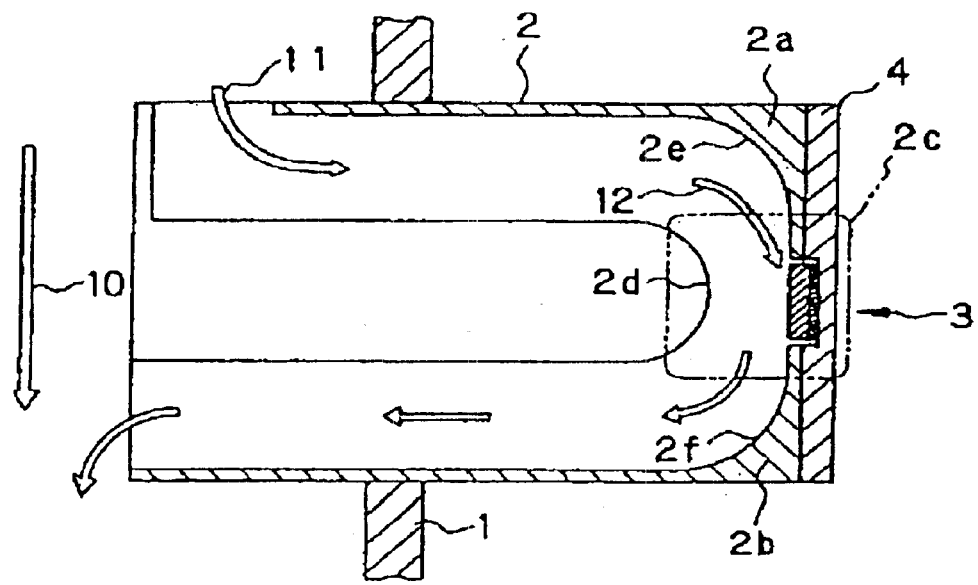
FIG. 1(A) and FIG. 1(B) are explanatory views of a flow measurement device of an Embodiment 1 of the invention, wherein (B) is an enlarged view in the vicinity of a detection portion shown in (A)
Figure 1:
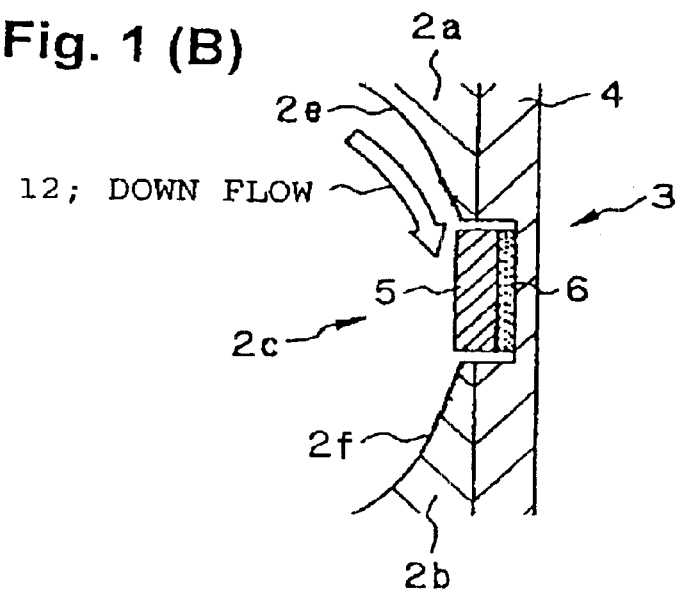

Reference numerals are used to identify items shown in the drawings as follows:

| | |
|---|---|
| 1 | main flow pipe |
| 2 | divided flow pipe |
| 2a, 2b | protuberance |
| 2c | curved portion or inverted arc |
| 2d | opposed face |
| 2e, 2f | flow passage face |
| 3 | detection portion |
| 4 | support body |
| 5 | detection element |
| 6 | bonding layer |
| 10 | flow in the main flow pipe |
| 11 | flow introduced into the divided flow pipe |
| 12 | flow (down flow) obliquely impinging against the detection element |
| 20 | heater |
| 21 | rim portion |
| 22 | diaphragm portion |
| 23 | upstream temperature sensor |
| 24 | downstream temperature sensor |
| 25 | atmosphere temperature sensor |
| 30 | semiconductor layer |
| 31 | 1st $Si_xN_y$ insulation layer |
| 32 | 2nd $Si_xN_y$ insulation layer |
| 33 | platinum resistor |
| 34 | pad |

DESCRIPTION OF THE PREFERRED EMBODIMENTS

Embodiment 1

FIG. 1(A) and FIG. 1(B) are explanatory views of a measurement device of an Embodiment 1 of the invention, wherein FIG. 1(A) is an explanatory view schematically showing a longitudinal sectional view of a divided flow pipe, and FIG. 1(B) an enlarged view in the vicinity of a detection portion. Referring to FIG. 1(A) and FIG. 1(B), in this measurement device, a divided flow pipe 2 is attached to a main flow pipe 1 so as to be basically orthogonal. A flow in the main flow pipe 1, which is a detection object, is introduced into the divided flow pipe 2.

The divided flow pipe 2 is curved such that the flow taken into the divided flow pipe 2 can be inverted. The divided flow pipe 2 has two mutually parallel straight flow portions extending in a direction approximately orthogonal to a flow 10 in the main flow pipe 1 where the divided flow pipe 2 is attached to the main flow pipe 1, a curved portion 2c for connecting the two strait flow portions (straight flow passages), an inlet port provided in a side face (face orthogonal to the flow 10) of one straight flow portion, and an outlet port provided in an end face (face parallel to the flow 10) of the other straight flow portion. In the vicinity of the curved portion 2c, flow passage faces 2e, 2f have a predetermined curvature and, in the vicinity of the curved portion 2c, the flow is sharply changed in its direction or substantially inverted. In the curved portion 2c, a detection portion 3 is provided in a bottom wall of the divided flow pipe 2. The detection portion 3 is positioned outside the main flow pipe 1, and made exchangeable.

Further, within the divided flow pipe 2, in an upstream and a downstream of the detection portion 3, there are formed protuberances 2a, 2b such that a pipe wall concavely protrudes toward a flow section center direction. The flow passage faces 2e, 2f on the protuberances 2a, 2b form a concave curved face. In the curved portion 2c, an opposed face 2d which is a flow passage face opposite to the detection portion 3 is formed as a convex curved face which is convex toward the detection portion 3.

Next, a detailed structure in the vicinity of the detection portion 3 is explained. Referring to FIG. 1(B), a detection element 5 is fixed to a concave portion bottom face of a support body 4 through a bonding layer 6 such that it protrudes at least as far as a surface of the support body 4. The support body 4 is attached to a bottom face of the divided flow pipe 2 such that a detection face (central left side face in FIG. 1(B)) of the detection element 5 is exposed inside the divided flow pipe 2 through a window formed in the bottom wall of the divided flow passage 2. Between the detection element 5 and the protuberances 2a, 2b, slight gaps are respectively formed. The detection face of the detection element 5 is approximately the same height as the flow passage faces 2e, 2f adjoining the detection element 5 with the gaps or protruded into the divided flow passage 2 at least as far as them or, reversely, exists at a retracted position.

Further, it is considered that, in the curved portion 2c, the flow at a side where the detection element 5 is present becomes fast moving, and the flow at a side of the opposed face 2d becomes slow.

Consecutively, referring to FIG. 1(A) and FIG. 1(B), a flow in the divided flow pipe 2 is explained. That is, the flow 10 in the main flow passage 1 is introduced into the divided flow pipe 2, and a flow 11 flowing in a direction approximately orthogonal to the flow 10 is generated. In the curved portion 2c, from the flow 11 a down flow 12 is generated which obliquely flows toward the detection portion 3 and approximately obliquely impinges against the detection face of the detection element 5. Thereafter, the flow in the divided flow passage 2 joins the flow 10.

Referring to FIG. 1(A), since the flow in the divided flow pipe 2 is formed approximately symmetrically with the curved portion 3 being made a center, it is possible to suitably measure both a normal flow flowing in a direction of the flows 11, 12 and a reverse flow flowing in a direction approximately reverse to the former. Further, it is considered that, by the fact that the inlet port of the divided flow pipe 2 opens in a plane orthogonal to the flow 10 in the main flow pipe 1, a low flow velocity portion is formed in an inner part of the inlet port of the divided flow pipe 2, and dust settles there. In this manner, contamination of the detection element 5 is prevented.

Figure 2A:
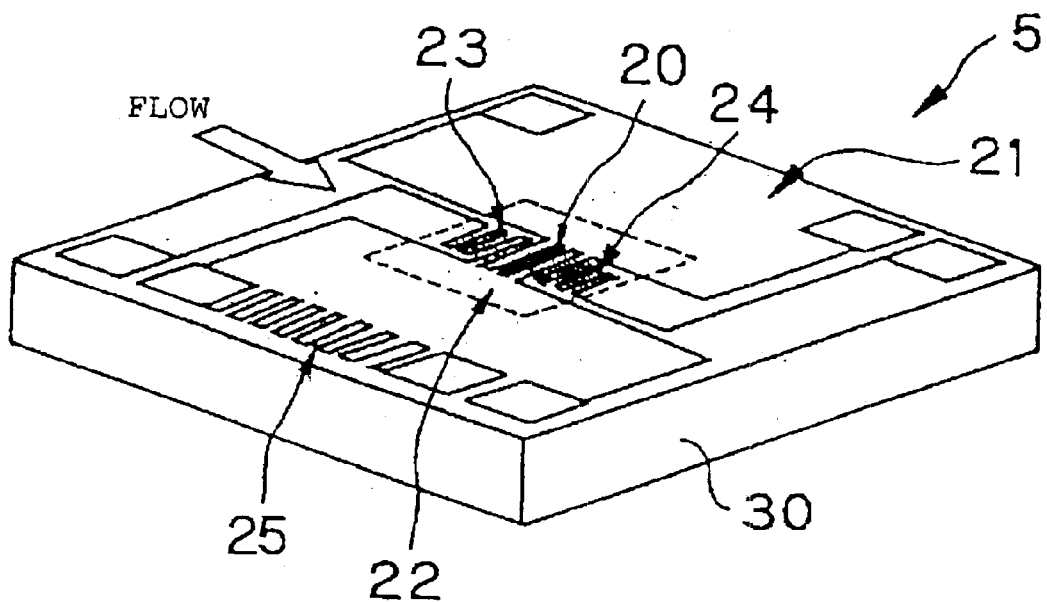
FIG. 2(A) and FIG. 2(B) are explanatory views of an detection element, wherein (A) is a perspective view, and (B) a sectional view for explaining a thin film resistor formed in the detection element shown in (A)
Figure 2:
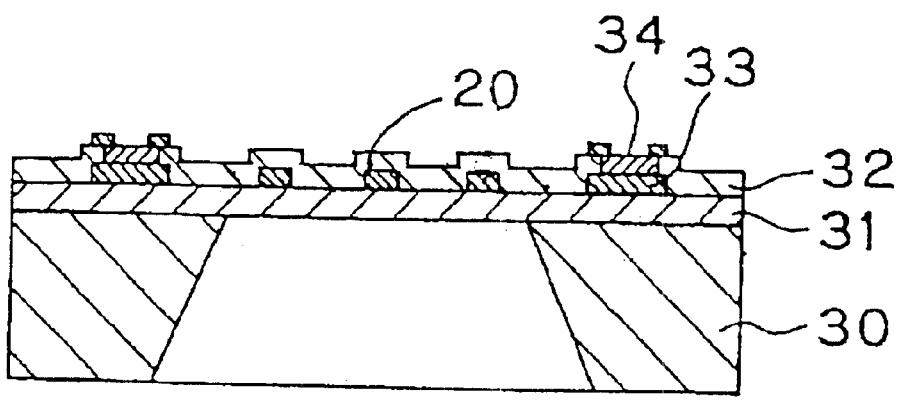

Here, the detection element 5 shown in FIG. 1(B) is explained in detail. FIG. 2(A) and FIG. 2(B) are explanatory views of the detection element, wherein FIG. 2(A) is a perspective view, and FIG. 2(B) is a sectional view for explaining thin film resistors formed in the detection element shown in FIG. 2(A).

Referring to FIG. 2(A), the detection element 5 is one in which basically four thin film resistors are provided on a semiconductor chip. More concretely, a diaphragm portion 22 and a rim portion 21 are provided on a semiconductor layer 30. The diaphragm portion 22 is provided with (1) an upstream temperature sensor 23, (2) a downstream temperature sensor 24, and (3) a heater 20 disposed between the upstream sensor 23, 24. On the other hand, the rim portion 22 is provided with (4) an atmosphere temperature sensor 25. The diaphragm portion 22 is made thin on the order of $\mu$m so as to isolate or prevent heat dissipation.

Next, a structure of each thin film resistor respectively constituting the heater 20, the atmosphere temperature sensor 25, the upstream temperature sensor 23 and the downstream temperature sensor 24 are explained. Referring to FIG. 2(B), a first $Si_xN_y$ insulation film 31 is formed on the semiconductor layer 30. A platinum resistor 33 is pattern-formed on the first $Si_xN_y$ insulation film 31. A pad 34 electrically connected to the platinum resistor 33 is formed on a predetermined portion of the platinum resistor 33. A second $Si_xN_y$ insulation film 32 is formed on a residual portion of the 1st $Si_xN_y$ insulation film 31 so as to cover the platinum resistor 33. The heater 20 generates heat by electrically connecting the pad 34 to an external circuit and supplying electric power to the heater 20 through the platinum resistor 33.

Next, a principle of detecting various quantities concerning the flow such as flow velocity and flow rate using the detection element is explained. FIG. 3(A) and FIG. 3(B) are explanatory views of a measurement principle of the detection element, wherein FIG. 3(A) is an isothermal line view showing temperature distribution formed on the position of the diaphragm on the detection element, and FIG. 3(B) is another isothermal line view.

The detection principle is explained as follows by referring to FIG. 3(A) to FIG. 3(B).

(1) The electric power supplied to the heater is controlled such that the heater has a constant temperature difference with respect to an atmosphere temperature.

(2) Accordingly, in the case where there is no flow, as shown in FIG. 3(A), temperatures of the upstream temperature sensor and the downstream temperature sensor are the same.

(3) However, where there is a flow, as shown in FIG. 3(B), the temperature of the upstream temperature sensor descends because heat escapes from its surface. As for the temperature of the downstream temperature sensor, since heat input from the heater increases because the downstream sensor is located downstream of the heater, the temperature drop is far smaller than that of the upstream temperature sensor. There is also a case where the temperature of the downstream temperature sensor ascends, depending on flow speed.

(4) On the basis of a temperature difference measured between the upstream temperature sensor and the downstream temperature sensor, the flow rate and the flow velocity, etc., are detected and, from a sign of the temperature difference, a flow direction is detected. The temperature difference can be detected based on a change in electric resistance with a change in temperature detected between the two sensors.

Embodiment 2

Next, as the measurement device of Embodiment 2 of the invention, an example is explained using the divided flow pipe having a structure in which a flow sectional diameter changes besides the structure possessed by the divided flow pipe in Embodiment 1. Therefore, in order to avoid a repetition in the following explanation, the device according to Embodiment 2 is explained mainly about portions different from the Embodiment 1 and as to the similar portions, the descriptions relating to Embodiment 1 are suitably applied to Embodiment 2.

Figure 4:
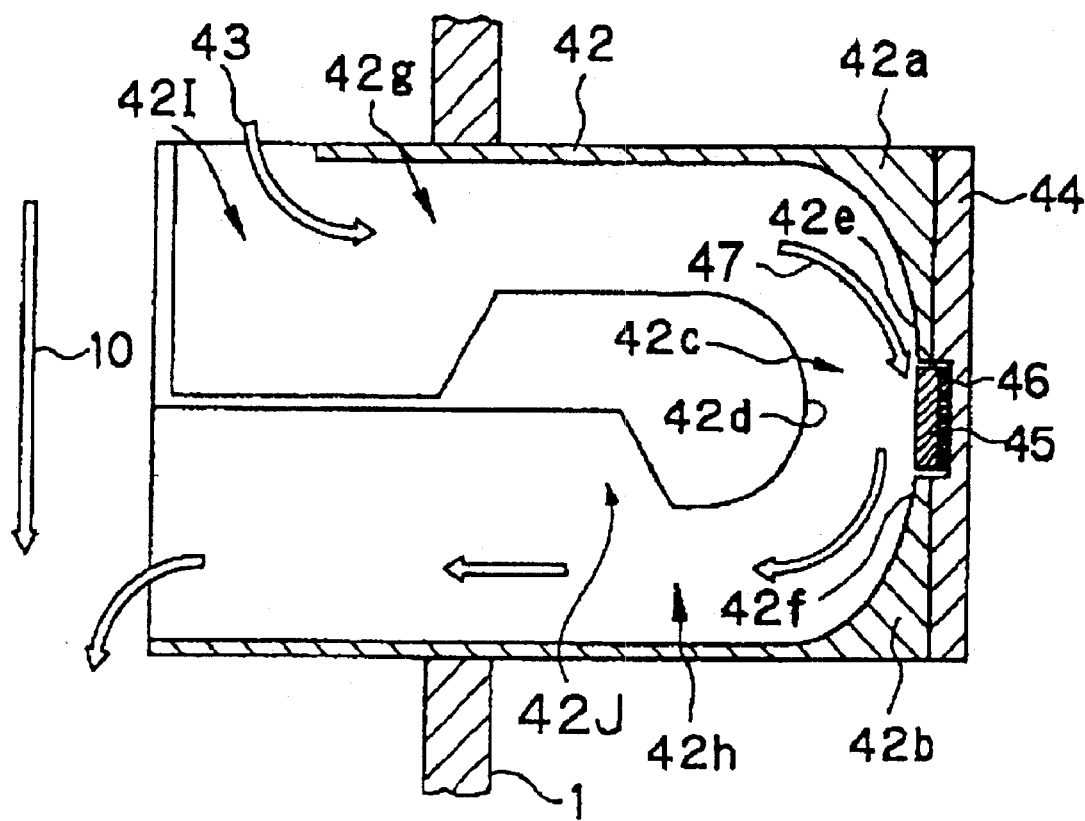
FIG. 4 is an explanatory view of a flow rate measurement device of an Embodiment 2 of the invention.

FIG. 4 is an explanatory view of the measurement device of Embodiment 2 of the invention, and it schematically shows a longitudinal sectional view of the divided flow pipe. Referring to FIG. 4, a divided flow pipe 42 in this flow rate measurement device has, at its upstream side straight flow portion, a portion whose flow sectional diameter is reduced or throttled along a flow direction (hereafter, this is referred to as "reduced diameter portion" 42g) and has, at its downstream side straight flow portion, a portion whose flow sectional diameter is increased along the flow direction (hereafter, this is referred to as "increased diameter portion" 42h). By this, low flow velocity portions, i.e., stagnant portions 42I, 42J, are generated respectively in an upstream portion and a downstream portion of the divided flow pipe 42 by enlarging the passage as shown in FIG. 4. The stagnant portion 42I falls off and gathers dirt or foreign substance that flows in with the object flowing into the passage of the flow divided pipe before flowing toward a detection element 45 so that the detection element 45 is protected from the dirt.

Further, the detection element 45 is fixed to a concave portion bottom face of a support body 44 through a bonding layer 46 under a state that it protrudes from the support body 44. The support body 44 is attached to a bottom face of the divided flow pipe 42 such that a detection face of the detection element 45 is exposed inside the divided flow pipe 42. Detailedly, at a bottom side of a curved portion 42c, the detection face of the detection element 45 is exposed inside the divided flow pipe 42. On both upstream and downstream sides of the detection element 45, protuberances 42a, 42b are formed in which a pipe wall protrudes so as to form a concave curved face elevating from the pipe wall toward the detection element 45. Flow passage faces 42e, 42f of the protuberances 42a, 42b are formed in a curved face form. In the curved portion 42c, an opposed face 42d which is a flow passage face opposite to the detection element 45 is formed as a convex curved face which is convex toward the detection element 45.

Here, a flow in the divided flow pipe 42 is explained. A flow 43 is introduced into the divided flow pipe 42 from the flow 10 in the main flow pipe 1. In the curved portion 42c, a down flow 47 obliquely impinging against the detection face of the detection element 45 is generated. Thereafter, the flow in the divided flow pipe 2 joins the flow 10 in the main flow pipe 1 again.

Measurement 1

Figure 5:
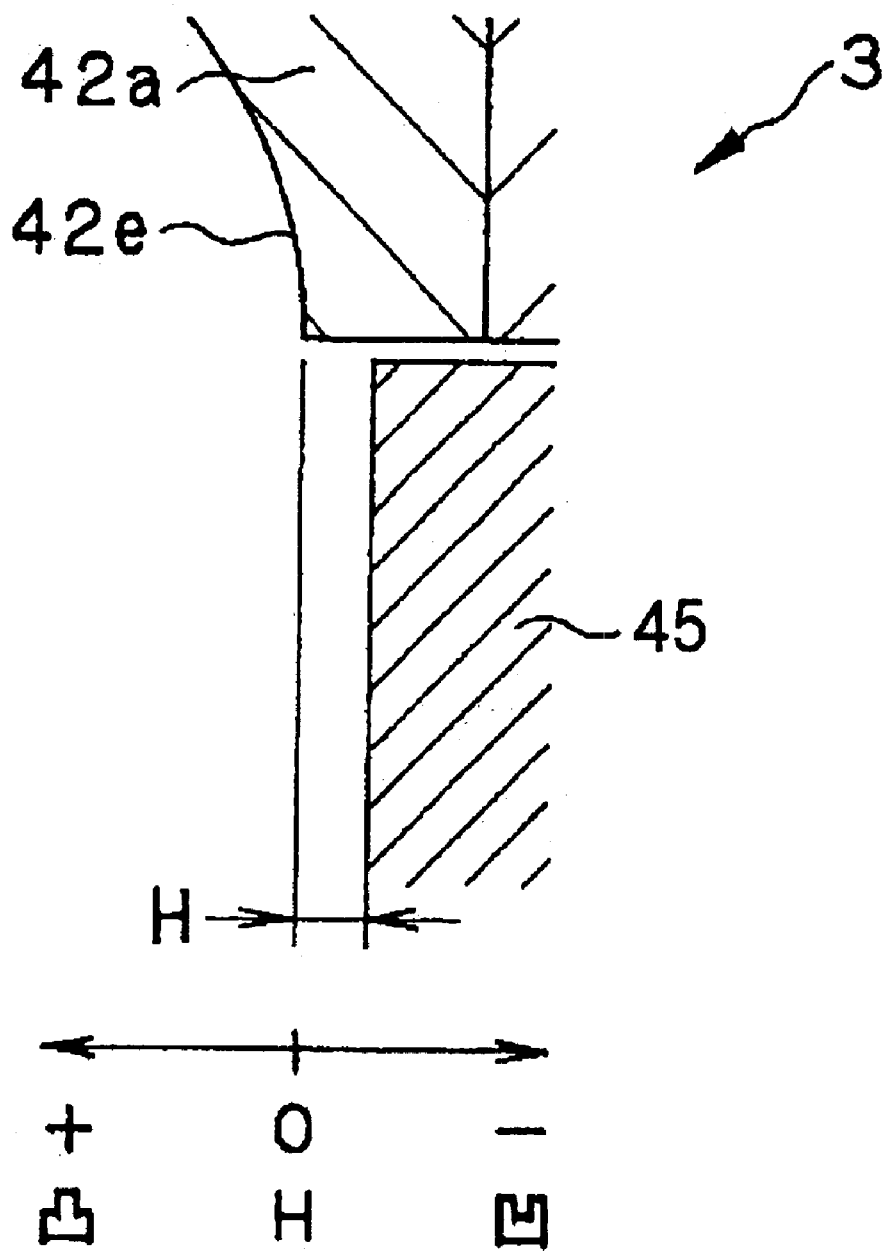
FIG. 5 is a view for explaining a principle of a step in a Measurement 1 in which the flow rate measurement device of Embodiment 2 of the invention is used.

By using the measurement device of Embodiment 2 of the invention and, further, by changing a height H (this is referred to as "step amount H" ) of the detection face of the detection element with respect to a flow passage face in the vicinity of the detection element's detection face and a flow velocity, which is a measurement object, in the main flow pipe, a detection output, concerning the flow velocity, of the detection element was measured. FIG. 5 is a view for explaining a definition of the step amount in Measurement 1. Referring to FIG. 5, a sign of the height in the case where the detection face of the detection element 45 protrudes from the flow passage faces 42e, 42f (as to the flow passage face 42f, refer to FIG. 4) (in case of convex) is made "+", and a sign in case where it is retracted (in case of concave) is made "−".

Figure 6:
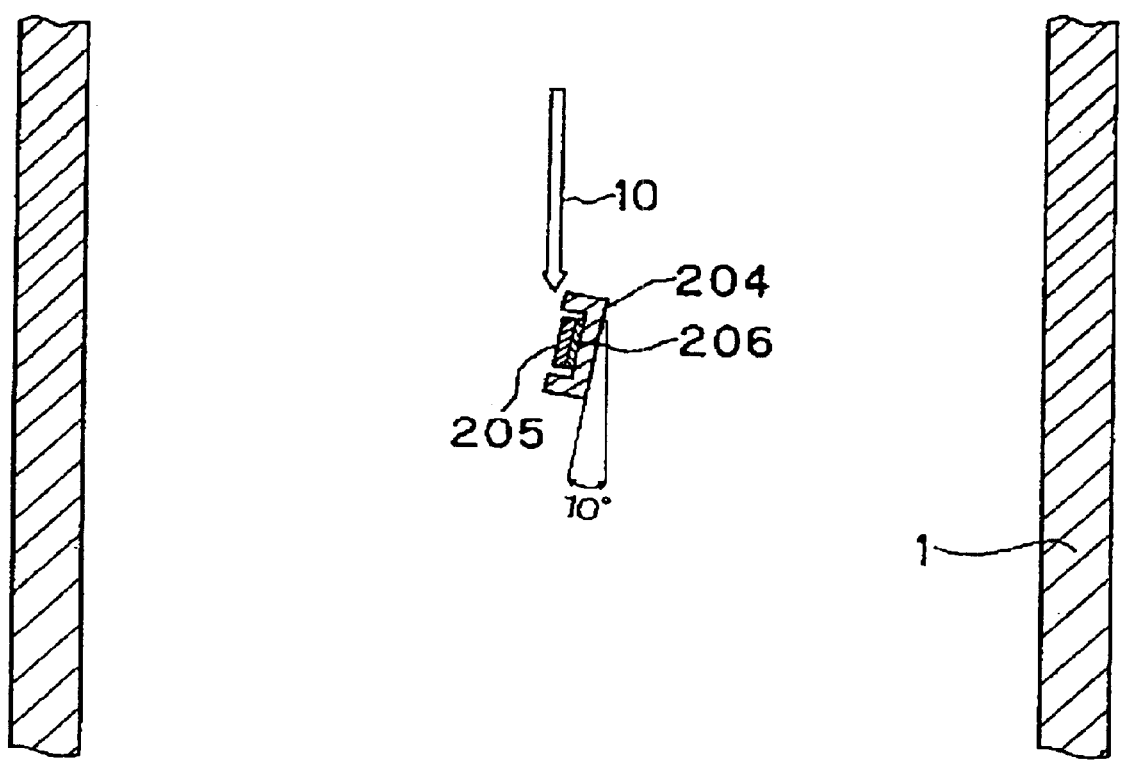
FIG. 6 is an explanatory view of a flow rate measurement device of a comparison example, which has been used in the Measurement 1.

Further, for comparison, by using a measurement device of a comparison example, a measurement was performed similarly to the measurement device of Embodiment 2. FIG. 6 is an explanatory view of the measurement device of the comparison example, and it schematically shows a longitudinal sectional view of its main flow pipe. Referring to FIG. 6, in the measurement device of this comparison example, a detection element 205 is disposed approximately at a center along a flow sectional direction in the main flow pipe 1. The detection element 205 is fixed to a concave portion bottom face of a support body 204 through a bonding layer 206. More detailedly, the support body 204 is held in the main flow pipe 1 such that a detection face of the detection element 205 is slanted by 10 degrees with respect to a pipe axis direction oriented to a direction of the flow 10 in the main flow pipe 1, so that the flow 10 is adapted so as to well impinge against the detection face.

Measurement Conditions of Measurement 1

Here, measurement conditions of Measurement 1 are recited below.

Figure 7:
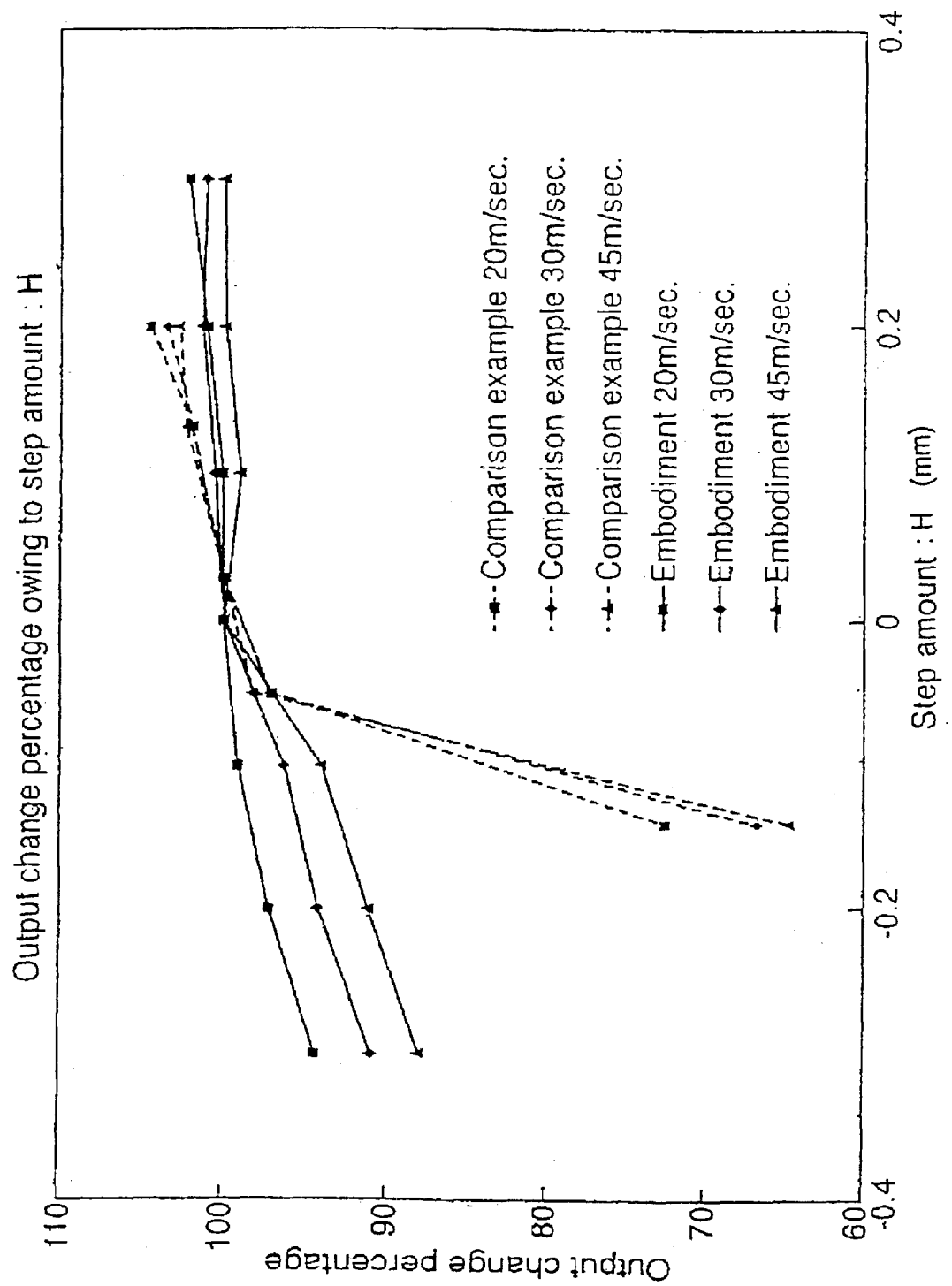
FIG. 7 is a graph showing results of the Measurement 1.

Pipe diameter of main flow pipe: 50 mm,
External dimensions of divided flow pipe: L40×W7×H14 mm,
Inlet port of divided flow pipe: 5×10 mm,
Outlet port of divided flow pipe: 5×5 mm,
Large diameter portion of divided flow pipe: 5×5 mm,
Small diameter portion of divided flow pipe: 5×2.5 mm,
Curvature of the protuberance of divided flow pipe : 4 mm,
Curvature of opposed face: 3.5 mm
External dimensions of detection element (semiconductor chip): 3×3×0.4 thick mm,
Diaphragm portion of detection element: 1 mm ×1 mm ×1 $\mu$m thick,
Platinum resistor of detection element: Pt/Ti=film thickness ratio 5/1 and
Pad of detection element: Au; thickness of resistor or pad being 0.1 $\mu$m and protection cover thereon being 0.3 $\mu$m FIG. 7 is a graph showing results of the Measurement 1. Here, in this drawing, an output change rate (%) is one in which each output is converted with an output in case where the step amount H (refer to FIG. 5) is substantially 0, i.e., in case where the detection face of the detection element and the flow passage face in the vicinity thereof exist on the same plane, being made 100%.

Referring to FIG. 7, it is understood that the device of Embodiment 2 becomes markedly small in its change in flow velocity detection output owing to the step amount in comparison with the device of the comparison example. Further, from FIG. 7, it is understood that, according to the device of Embodiment 2, the flow velocity can be accurately detected over a wide flow velocity range. Furthermore, besides, the device of the Embodiment 2 can detect a reverse flow, but such a matter is difficult in the device of the comparison example. It is further understood that when the step amount or a protruding height (H) of the element from the adjoining vicinity face is shifted to a plus value, a variation of the output change percentage caused by a flow speed difference is far smaller than that shifted to a minus value, which is very important information not only for making a wide range flow measurement device but also for quality control in mass-production of the flow measurement devices.

Embodiment 3

Figure 8:
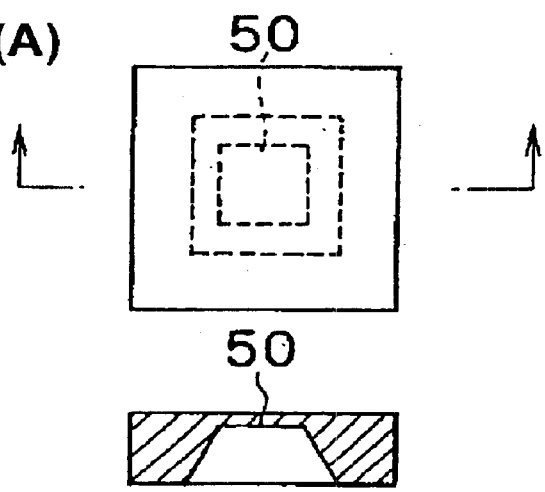
FIGS. 8(A) to (C) relate to an Embodiment 3 of the invention, and are explanatory views of various detection elements applied to the flow rate measurement device according to the invention, wherein respectively an upper drawing is a plan view and a lower drawing a sectional view in a plane center portion.
Figure 8:
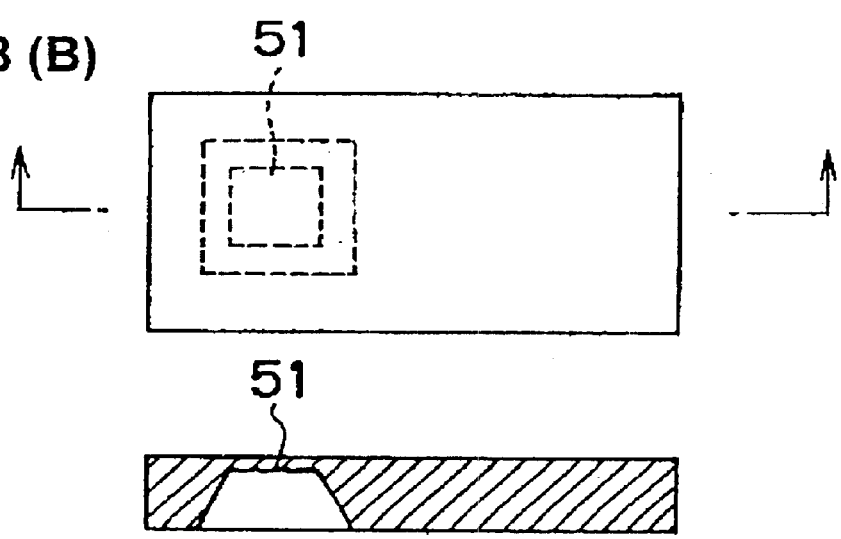
Figure 8:
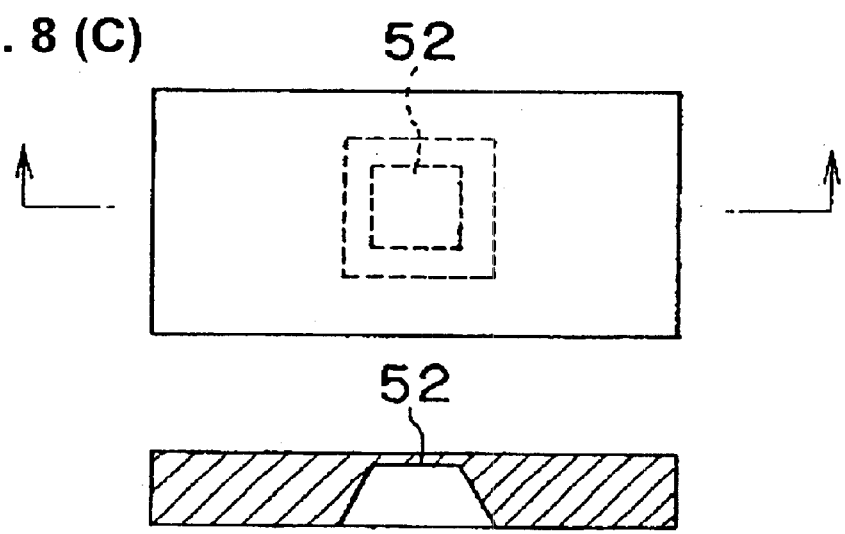

As Embodiment 3 of the invention, various shapes of the detection element applied to the measurement device according to the invention are explained. FIG. 8(A) to FIG. 8(C) relate to Embodiment 3 of the invention, and are explanatory views of the various shapes of the detection element applied to a flow rate measurement device according to the invention, wherein respectively the upper drawing is a plan view and the lower drawing is a sectional view of a plane center portion.

The detection element shown in FIG. 8(A) is a square type similar to the detection element used in Embodiments 1 and 2, and a diaphragm portion 50 is provided in a center portion of the square. The detection element shown in FIG. 8(B) is a rectangle type, and a diaphragm 51 is provided in an end portion of the rectangle. Further, the detection element shown in FIG. 8(C) is also a rectangle type, and a diaphragm portion 52 is provided in a center portion of the rectangle.

Embodiment 4

As an Embodiment 4 of the invention, various forms of the divided flow pipe used in the measurement device according to the invention are shown. Incidentally, as to points of the measurement device according to Embodiment 4 of the invention, which are similar to the measurement device according to Embodiment 1, the descriptions of Embodiment 1 or Embodiment 2 are suitably applied to Embodiment 4.

Embodiment 4-1

Figure 9:
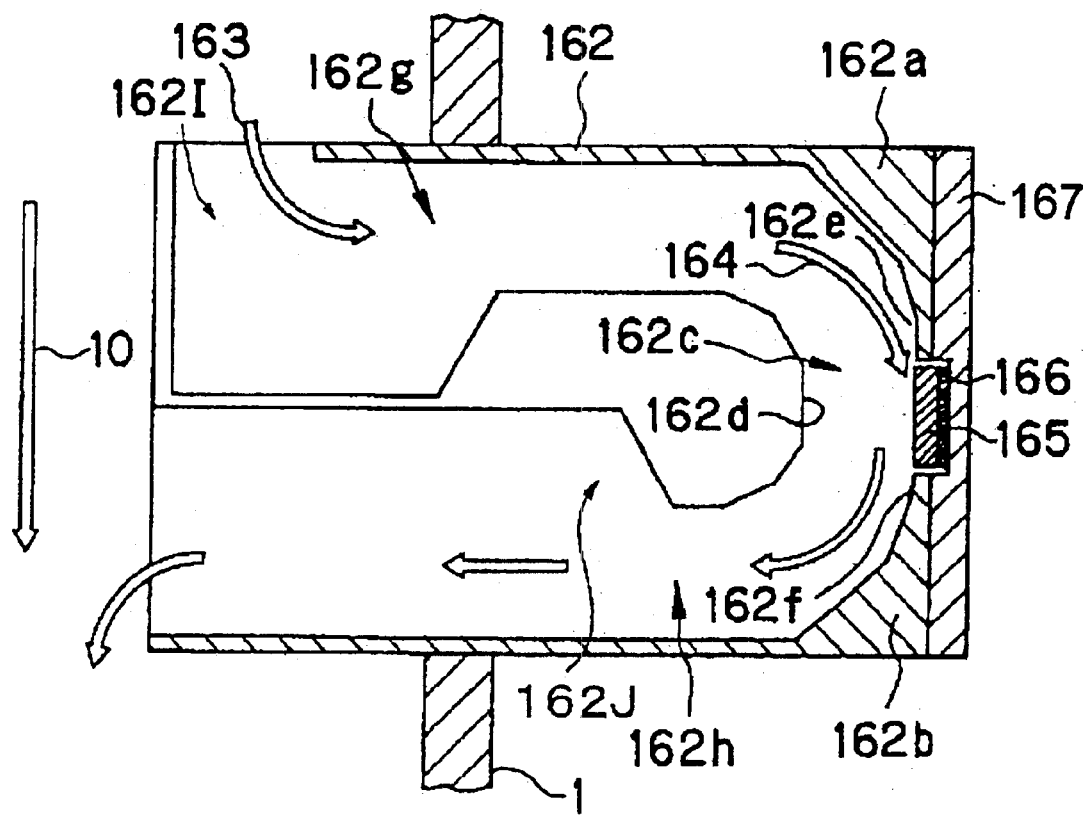
FIG. 9 is an explanatory view of a divided flow pipe of an Embodiment 4-1 of the invention.

FIG. 9 is an explanatory view schematically showing a longitudinal sectional view of the divided flow pipe of an Embodiment 4-1 of the invention. Referring to FIG. 9, a divided flow pipe 162 has a constitution similar to the divided flow pipe 42 (refer to FIG. 4) of the Embodiment described above 2, except that flow passage faces 162e, 162f and opposed face 162d are formed in polygonal faces. That is, the divided flow pipe 162 has a reduced diameter portion 162g and a stagnant portion 162I in an upstream side straight flow portion, and an increased diameter portion 162h and a stagnant portion 162J in a downstream side straight flow portion. And, a detection element 165 is fixed to a concave portion bottom face of a support body 164 through a bonding layer 166 under a state that it protrudes at least as far as a surface of the support body 164. The support body 164 is attached to a bottom face of the divided flow pipe 162 such that a detection face of the detection element 165 is exposed inside the divided flow pipe 162. Detailedly, at a bottom side of a curved portion 162c, the detection face of the detection element 165 is exposed inside the divided flow pipe 162. On both sides of the detection element 165, protuberances 162a, 162b are formed in which a pipe wall concavely protrudes inwardly. Flow passage faces 162e, 162f of the protuberances 162a, 162b are formed in a polygonal face. The opposed face 162d is formed in a polygonal shape which is convex toward the detection element 165.

Here, a flow in the divided flow pipe 162 is explained. A flow 163 is introduced into the divided flow pipe 162 from the flow 10 in the main flow pipe 1. In the curved portion 162c, a down flow 167 obliquely impinging against the detection face of the detection element 165 is generated. Thereafter, the flow in the divided flow pipe 162 joins the flow 10 in the main flow pipe 1 again.

Embodiment 4-2

Figure 10:
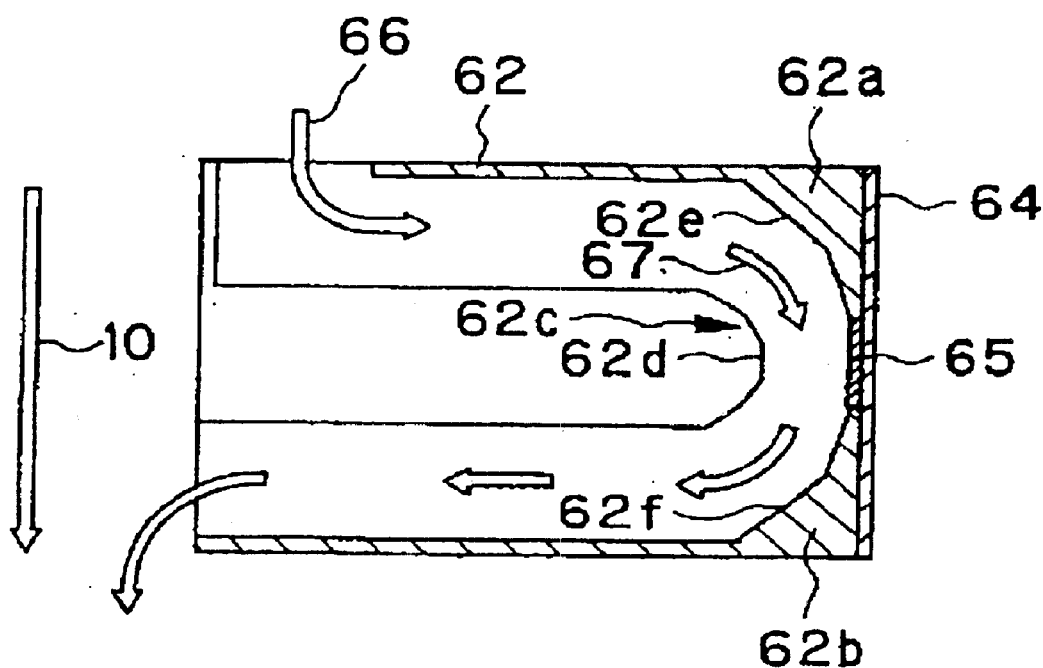
FIG. 10(A) is an explanatory view of the divided flow pipe of an Embodiment 4-2 of the invention, and FIG. 10(B) that of an Embodiment 4-3 of the same.
Figure 10:
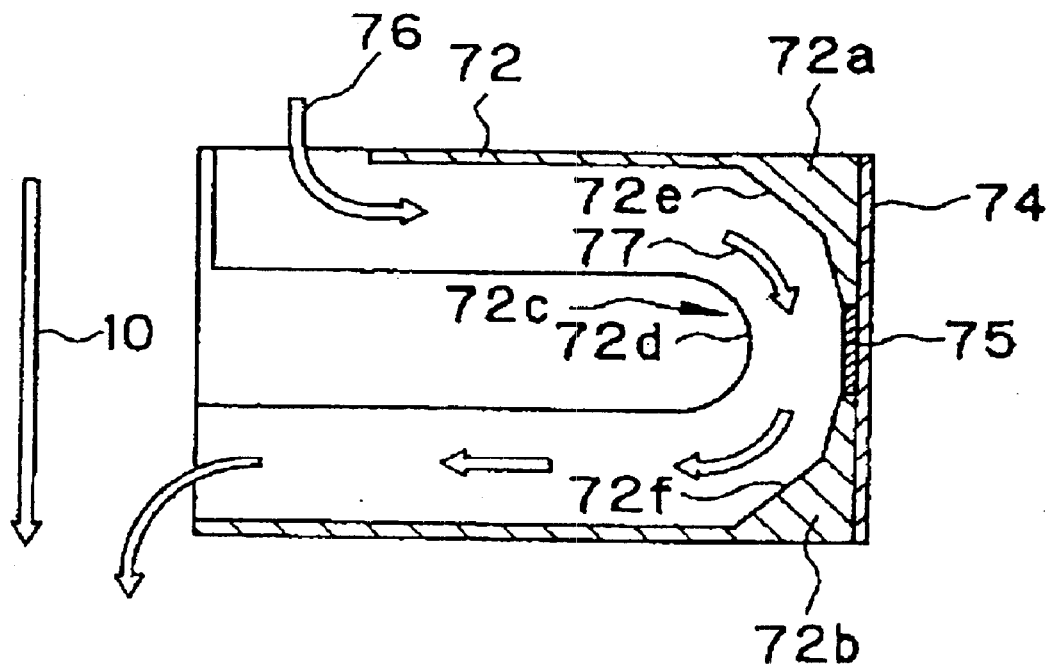

FIG. 10(A) is an explanatory view schematically showing a longitudinal sectional view of the divided flow pipe of Embodiment 4-2 of the invention. In this divided flow pipe 62, protuberances 62a, 62b are provided on both sides of a curved portion 62c. Both sides of the curved portion 62c, i.e., flow passage faces 62e, 62f of the protuberances 62a, 62b, are formed in a polygonal shape. An opposed face 62d opposite to a detection element 65 attached to a support body 64 is formed in a polygonal shape protruding toward the detection element 65. From a flow 66 formed by the fact that a part of the flow 10 is introduced into the divided flow pipe 62, a down flow 67 is generated obliquely impinging against a detection face of the detection element 65.

Embodiment 4-3

FIG. 10(B) is an explanatory view schematically showing a longitudinal sectional view of the divided flow pipe of Embodiment 4-3 of the invention. In this divided flow pipe 72, protuberances 72a, 72b are provided on both sides of a curved portion 72c. Both sides of the curved portion 72c, i.e., flow passage faces 72e, 72f of the protuberances 72a, 72b, are formed in a polygonal shape. An opposed face 72d opposite to a detection element 75 attached to a support body 74 is formed in a convex curved face form toward the detection element 75. From a flow 76 formed by the fact that a part of the flow 10 is introduced into the divided flow pipe 72, a down flow 77 is generated obliquely impinging against a detection face of the detection element 75.

Embodiment 4-4

Figure 11:
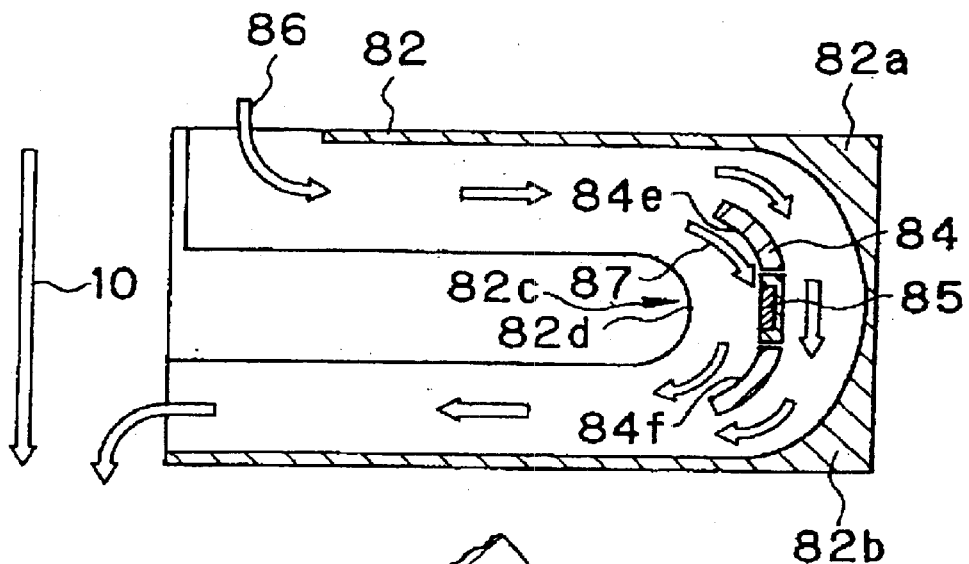
FIG. 11(A) is an explanatory view of the divided flow pipe of an Embodiment 4-4 of the invention, FIG. 11(B) that of the divided flow pipe of an Embodiment 4-5 of the same, and FIG. 11(C) that of the divided flow pipe of an Embodiment 4-6 of the same, respectively.
Figure 11:
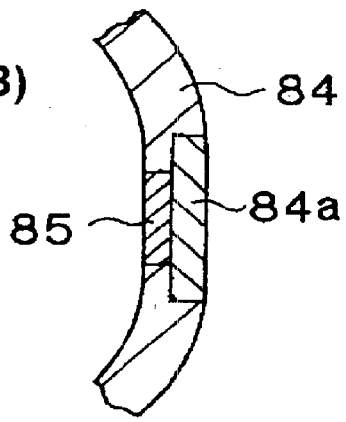
Figure 11:
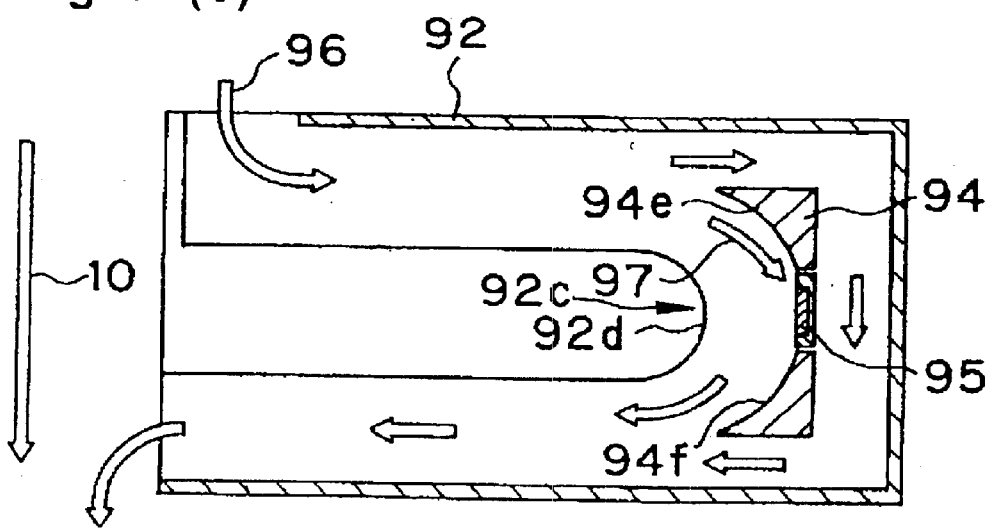

FIG. 11(A) is an explanatory view schematically showing a longitudinal sectional view of the divided flow pipe of an Embodiment 4-4 of the invention. Within a flow of this divided flow pipe 82, at a flow sectional direction center portion of a curved portion 82c, a support body 84 is positioned having arc-like portions, which are one kind of protuberance, on its both sides respectively. Flow passage faces 84e, 84f of a detection element 85 side of the ark-like portions are formed in a concave curved face form. Behind the detection element 85, flow passage faces of protuberances 82a, 82b of the divided flow pipe 82 are also formed in a concave curved face form. The detection element 85 is fixed to a concave portion bottom face formed in the support body 84, and its detection face is exposed to a flow at a flow sectional direction approximate center portion. An opposed face 82d opposite to a detection element 85 is formed in a convex curved face form protruding toward the detection element 85. From a flow 86 formed by the fact that a part of the flow 10, which is a measurement object, is introduced into the divided flow pipe 82, a down flow 87 is generated obliquely impinging against a detection face of the detection element 85.

Embodiment 4-5

FIG. 11(B) is an explanatory view schematically showing a part of a longitudinal sectional view of the divided flow pipe of Embodiment 4-5 of the invention. This divided flow pipe is different in its support form of the detection element 85 from the divided flow pipe 82 shown in FIG. 11(A). That is, two notches (windows) are formed respectively opening to one side face and the other side face in a support body 84. The two notches mutually communicate while having a step. A circuit board 84a is fitted into the notch whose width is large and the detection element 85 is fitted into the notch whose width is small.

Embodiment 4-6

FIG. 11(C) is an explanatory view schematically showing a part of a longitudinal sectional view of the divided flow pipe of an Embodiment 4-6 of the invention. Within a flow of this divided flow pipe 92, at a flow sectional direction center portion of a curved portion 92c, a support body 94 is positioned having triangle corner portions, which are one kind of protuberance, on its both sides respectively. Flow passage faces 94e, 94f of a detection element 95 side of the triangle portions are formed in a concave curved face form. Behind the detection element 95, flow passage faces of the divided flow pipe 92 are formed in a rectangular form. The detection element 95 is fixed to a concave portion bottom face formed in a support body 94, and its detection face is exposed to a flow at a flow sectional direction approximate center portion. An opposed face 92d opposite to the detection element 95 is formed in a convex curved face form protruding toward the detection element 95. From a flow 96 formed by the fact that a part of the flow 10, which is a measurement object, is introduced into the divided flow pipe 92, a down flow 97 is generated obliquely impinging against a detection face of the detection element 95.

Embodiment 4-7

Figure 12:
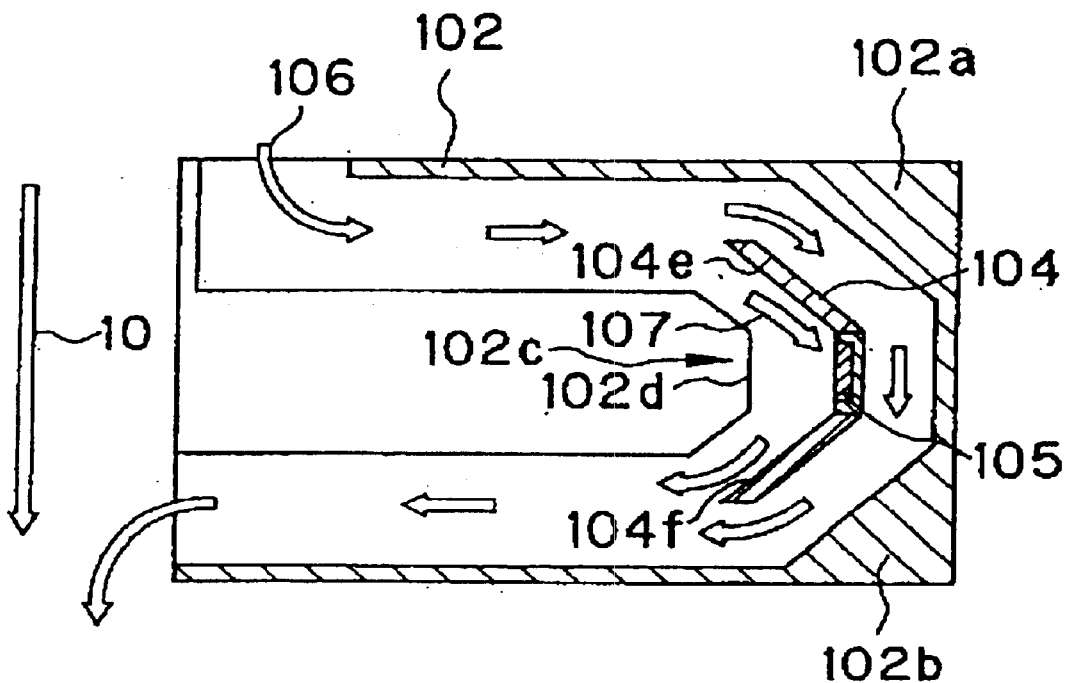
FIG. 12(A) is an explanatory view of the divided flow pipe of an Embodiment 4-7 of the invention, and FIG. 12(B) that of an Embodiment 4-8 of the same.
Figure 12:
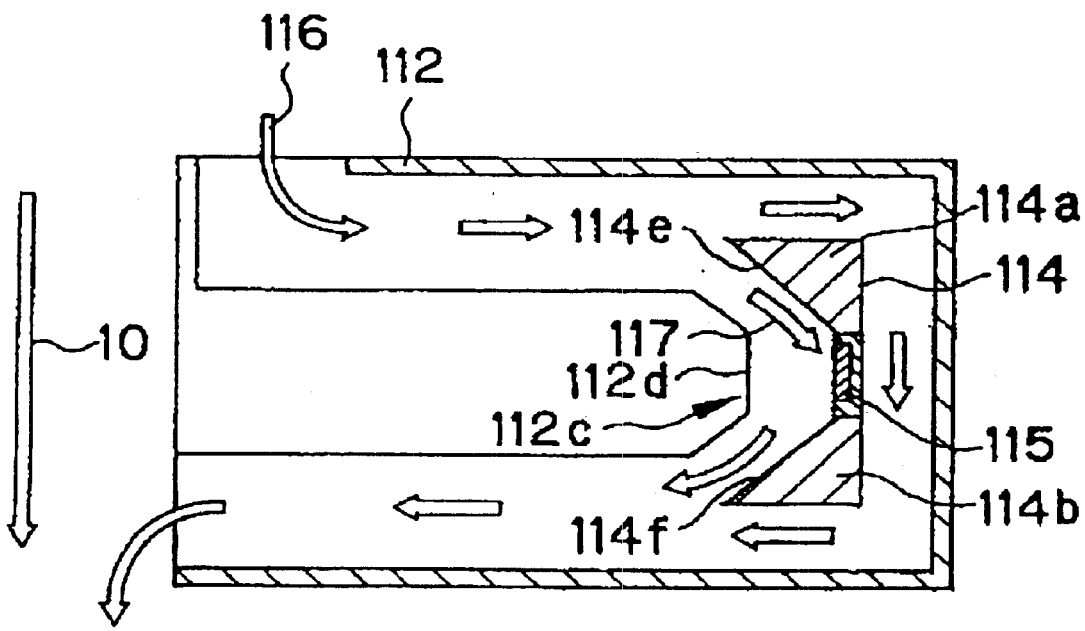

FIG. 12(A) is an explanatory view schematically showing a part of a longitudinal sectional view of the divided flow pipe of Embodiment 4-7 of the invention. Within a flow of this divided flow pipe 102, at a flow sectional direction center portion of a curved portion 102c, a support body 104 is positioned having extension portions, which are one kind of protuberance and extend respectively toward an upstream side and a downstream side, on both of its sides. Flow passage faces 104e, 104f of a detection element 105 side of the extension portions are made into slant faces slanting toward the detection element 105. On both sides of the curved portion 102c and behind the detection element 105, protuberances 102a, 102b are formed. Flow passage faces of the protuberances 102a, 102b protrude toward the support body 104 side and are made into slant faces approximately parallel to the flow passage faces 104e, 104f. The detection element 105 is fixed to a concave portion bottom face formed in the support body 104, and its detection face is exposed to a flow at a flow sectional direction approximate center portion. An opposed face 102d opposite to the detection element 105 is formed in a polygonal shape protruding toward the detection element 105. From a flow 106 formed by the fact that a part of the flow 10, which is a measurement object, is introduced into the divided flow pipe 102, a down flow 107 is generated obliquely impinging against a detection face of the detection element 105.

Embodiment 4-8

FIG. 12(B) is an explanatory view schematically showing a part of a longitudinal sectional view of the divided flow pipe of an Embodiment 4-8 of the invention. Within a flow of this divided flow pipe 112, at a flow sectional direction center portion of a curved portion 112c, a support body 114 is positioned having triangle corner portions 114a, 114b, which are one kind of protuberance and extend respectively toward an upstream side and a downstream side, on both of its sides. Flow passage faces 114e, 114f of a detection element 115 side of the triangle corner portions are made into slant faces slanting toward the detection element 115. On both sides of the curved portion 112c and behind the detection element 115, a rectangular flow passage face is formed. The detection element 115 is fixed to a concave portion bottom face formed in the support body 114, and its detection face is exposed to a flow at a flow sectional direction approximate center portion. An opposed face 112d opposite to the detection element 115 is formed in a polygonal shape protruding toward the detection element 115. From a flow 116 formed by the fact that a part of the flow 10, which is a measurement object, is introduced into the divided flow pipe 112, a down flow 117 is generated obliquely impinging against a detection face of the detection element 115. Embodiment 4-9

Figure 13:
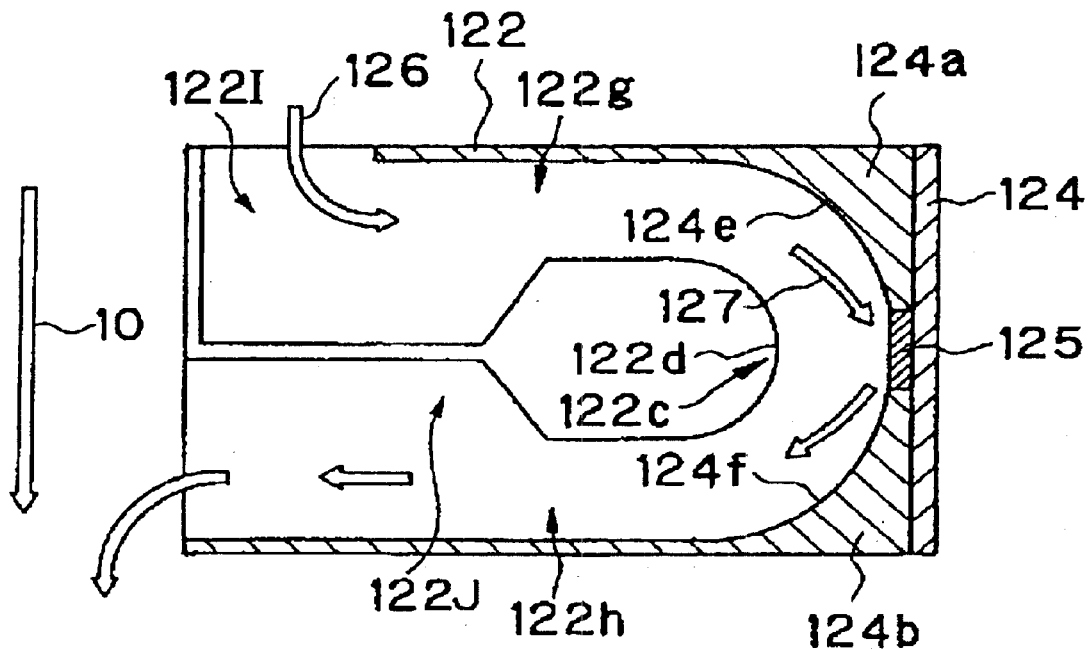
FIG. 13 (A) is an explanatory view of the divided flow pipe of an Embodiment 4-9 of the invention, and FIG. 13(B) that of an Embodiment 4-10 of the same.
Figure 13:
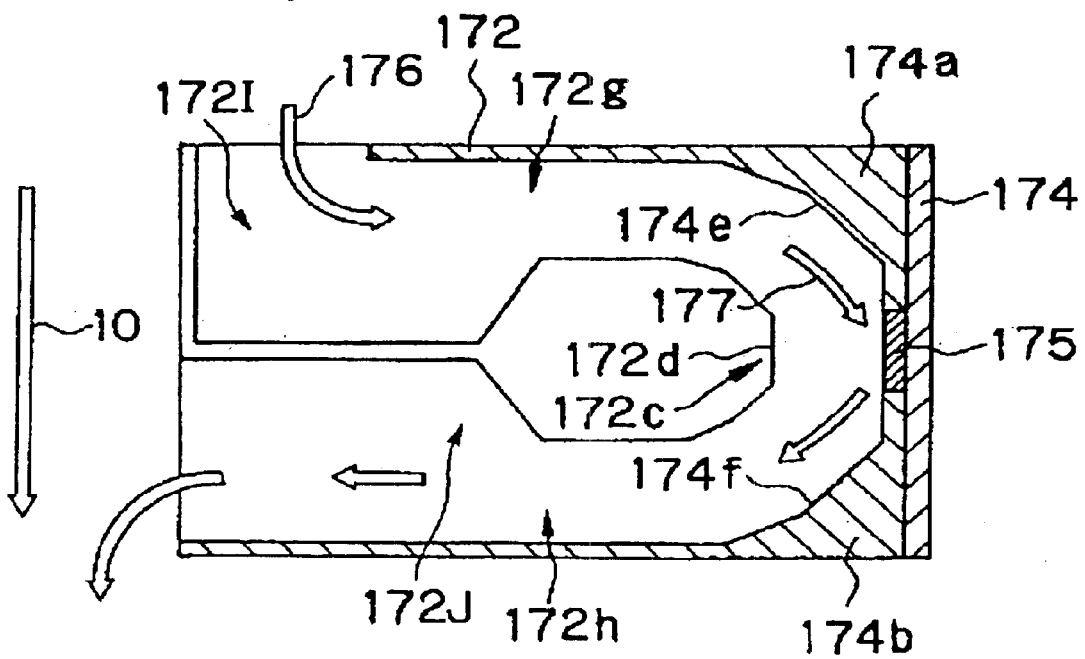

FIG. 13(A) is an explanatory view schematically showing a part of a longitudinal sectional view of the divided flow pipe of Embodiment 4-9 of the invention. In this divided flow pipe 122, there are formed mutually symmetrically, in its upstream side straight flow portion, a reduced diameter portion 122g and a stagnant portion 122I and, in its downstream side straight flow portion, an increased diameter portion 122h and a stagnant portion 122J. And, in the divided flow pipe 122, protuberances 124a, 124b are provided on both sides of a curved portion 122c. Both sides of the curved portion 122c, i.e., flow passage faces 124e, 124f of the protuberances 124a, 124b, are formed in a concave curved face form. An opposed face 122d opposite to a detection element 125 fixed to a support body 124 is formed in a convex curved face form protruding toward the detection element 125. From a flow 126 formed by the fact that a part of the flow 10, which is a measurement object, is introduced into the divided flow pipe 122, a down flow 127 is generated obliquely impinging against a detection face of the detection element 125. In order to easily attain this impinging effect to the flow detection element, as shown in the drawings, an in-flow is inverted changing its flow direction so as to oppose its out-flow direction by turning at or around the element.

Embodiment 4-10

FIG. 13(B) is an explanatory view schematically showing a part of a longitudinal sectional view of the divided flow pipe of an Embodiment 4-10 of the invention. This divided flow pipe 172 of Embodiment 4-10 is different from divided flow pipe 122 (refer to FIG. 13(A)) of Embodiment 4-9 in that the flow passage face is polygonal, and other structural features are similar. Detailedly, in this divided flow pipe 172, there are formed mutually symmetrically, in its upstream side straight flow portion, a reduced diameter portion 172g and a stagnant portion 172I and, in its downstream side straight flow portion, an increased diameter portion 172h and a stagnant portion 172J. In this divided flow pipe 172, protuberances 174a, 174b are provided on both sides of a curved portion 172c. Both sides of the curved portion 172c, i.e., flow passage faces 124e, 124f of the protuberances 174a, 174b, are formed in a polygonal shape (concave form as a whole). An opposed face 172d opposite to a detection element 175 fixed to a support body 174 is formed in a polygonal shape (convex form as a whole) protruding toward the detection element 175. From a flow 176 formed by the fact that a part of the flow 10, which is a measurement object, is introduced into the divided flow pipe 172, a down flow 177 is generated obliquely impinging against a detection face of the detection element 175.

In the measurement devices of the Embodiment 4 described above, one in which the divided flow pipe has an approximately symmetrical flow passage shape with the curved portion where the detection element exists being made a center can be suitably used for measuring both normal flow and reverse flow. Further, according to the measurement device having a reduced diameter portion in the upstream side of the divided flow pipe, contamination of the detection element by fine particles and dust, etc., can be prevented in high degree. Further, according to the measurement device having the reduced diameter portion in the downstream side of the divided flow pipe, an influence of the reverse flow at a normal flow measurement time is suppressed.

Next, application examples in each of which the measurement device according to the invention is attached to an intake system of engine in various vehicles are explained. However, the present invention should not be construed as being limited thereto.

Application Example 1

Figure 14:
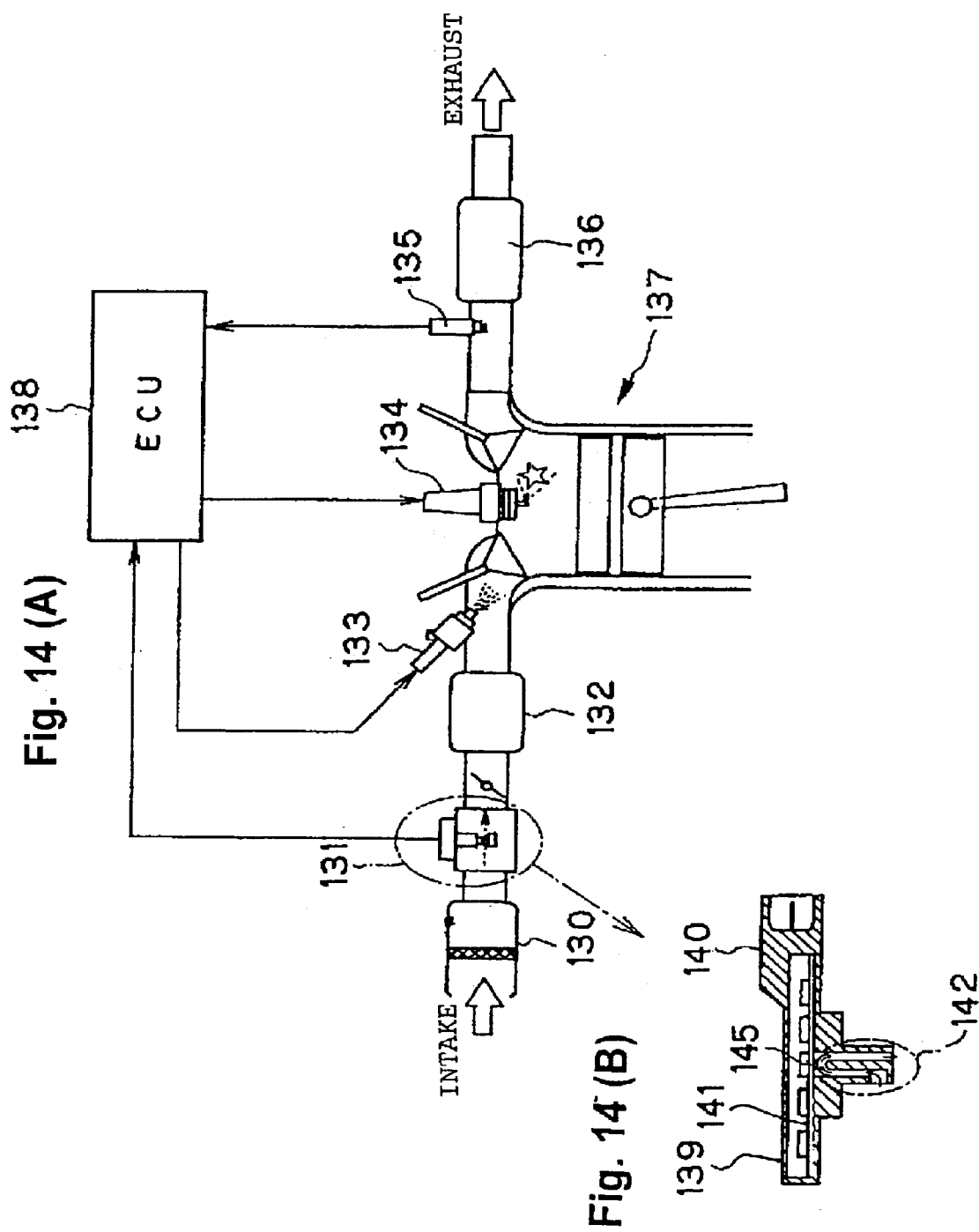

An Application Example 1 is an example in which the measurement device according to the invention has been attached to the intake system of engine mounted mainly on a four-wheel vehicle. FIG. 14(A) and FIG. 14(B) are views for explaining Application Example 1 of the measurement device according to the invention, wherein FIG. 14(A) is a total view and FIG. 14(B) an enlarged view of a portion in which the measurement device according to the invention has been installed.

In explaining an outline of the intake system or a fuel injection control system by referring to FIG. 14(A), in this system there are provided, in going from an upstream to a downstream, an air cleaner 130 through which an intake is introduced, an intake flow rate or flow velocity measurement section 131, a throttle valve 132, a cylinder 137 into which a fuel is injected from an injector 133, in which it is ignited by a spark plug and which has valves, an oxygen sensor 135 provided in an exhaust pipe in a downstream side of the cylinder 137 and a three way catalyst 136, such that they can be communicate through a piping.

The measurement device according to the invention is installed in the measurement section 131 positioned between the air cleaner 130 and the throttle valve 132. Especially, referring to FIG. 14(B), this measurement device is attached to an intake pipe shown in FIG. 14(A) through a case 139 in such a manner that a divided flow pipe 142 of a shape as shown in FIG. 1 and FIG. 4, etc., is connected to the intake pipe under an orthogonal state. In a curved portion bottom face of the divided flow pipe 142, a detection element 145 formed integrally with a silicon element is disposed, and the detection element 145 is electrically connected to a control circuit 141 having an integrated circuit on its back face for driving and controlling the detection element 145. The control circuit 141 is electrically connected to an engine control unit 138 and the like through a connector 140. The detection element 145 and the element integral type circuit 141 are attached to the case 139 so as to be detachable therefrom, or the case 139 is attached to the intake pipe so as to be detachable therefrom, and by this the detection element 145 is made exchangeable.

The engine control unit 138 receives a measurement signal from the element integral type circuit 141 and an oxygen concentration signal in exhaust gas outputted from the oxygen sensor 135 and, on the basis of these signals and other reception signals, controls a fuel injection quantity and a timing of the injector 133 and an ignition timing of the spark plug 134. Incidentally, the engine control unit 138 also operates an engine revolution number, a throttle open degree and a crank angle or the like.

Application Example 2

An Application Example 2 is an example in which the measurement device according to the invention has been attached to the intake system of engine mounted mainly on a two-wheel vehicle. FIG. 15(A) and FIG. 15(B) are views for explaining Application Example 2 of the measurement device according to the invention, wherein FIG. 15(A) is a total view and FIG. 15(B) an enlarged view of a portion in which the measurement device according to the invention has been installed.

Referring to FIG. 15(A) and FIG. 15(B), the measurement device according to the invention is attached to a two-wheel vehicle intake pipe (air funnel) 154 connected to a cylinder 151 in order to measure a flow rate or a flow velocity etc., of the intake. This measurement device has a case 152 positioned outside the two-wheel vehicle intake pipe 154 and a divided flow passage portion 153 protruding into a pipe of the two-wheel vehicle intake pipe 154, and the case 152 and the divided flow passage portion 153 are integrated. A detection element is provided in the divided flow passage portion 153 such that it is exposed to the intake introduced into the divided flow passage portion, and a circuit board for controlling the detection element is accommodated in the case 152.

In this manner, the measurement device according to the invention can be suitably used especially as a flow rate and flow velocity, etc., measurement device for the two-wheel vehicle, particularly as a device for measuring the intake of an engine for a two-wheel vehicle.

According to the invention, a device is provided for measuring a quantity concerning a flow such as flow rate or flow velocity, etc., which is easy to manufacture and has excellent detection accuracy.

It should further be apparent to those skilled in the art that various changes in form and detail of the invention as shown and described above may be made. It is intended that such changes be included within the spirit and scope of the claims appended hereto.

This application is based on Japanese Patent Application No. Hei. 11-174509, filed Jun. 21, 2000, which is incorporated herein by reference in its entirety.

What is claimed is:

1. A flow measurement device for measuring a flow rate and/or a flow velocity of an object flowing in a main flow pipe, comprising:
 a divided flow pipe having opposing flow passage faces into which some of the object is introduced from the main flow pipe;
 a detection element which is exposed to the flow in the divided flow pipe so as to detect the flow rate and/or the flow velocity; and
 a direction changer having opposing flow passage faces provided in the divided flow pipe for changing a flow direction of the object flowing in the divided flow pipe so as to direct the object obliquely toward a detection face of the detection element, said direction changer including a concave portion upstream of the detection element, and the detection element and concave portion are provided along the same flow passage face.

2. The flow measurement device as claimed in claim 1, wherein the direction changer has a curved portion having a concave shape formed in the divided flow pipe and the flow direction in the divided flow pipe is inverted by the curved portion, and wherein the detection element is disposed in a center of the curved portion.

3. The flow measurement device as claimed in claim 2, wherein a flow passage formed in the divided flow pipe is throttled or narrowed at a bottom of the curved portion so that a flow speed of the object flowing in the flow pipe becomes highest at the bottom of the curved portion and the detection element is disposed at the bottom of the curved portion.

4. The flow measurement device as claimed in claim 1, wherein the direction changer is an inner wall formed on the divided flow pipe formed in an upstream side of the detection element and slanting toward the detection element face such that the object flows along the slanted wall thereby impinging against the detection element.

5. The flow measurement device as claimed in claim 1, wherein the direction changer has an inverted arc including a slanted wall formed on the divided flow pipe at least at an upstream side of the detection element such that the object flows along the slanted wall thereby impinging against the detection element.

6. The flow measurement device as claimed in claim 5, wherein the slanted inner wall is a part of the concave portion along which the object flows and inverts its direction.

7. The flow measurement device as claimed in claim 1, said direction changer comprising a flow separator disposed in the middle of a flow passage in the divided flow pipe and formed in an upstream side of the detection element, the flow separator separating the flow and forming a slant face, a concave curved face, or a flat face such that the object flows along the flow separator thereby impinging against the detection element.

8. The flow measurement device as claimed in claim 1, wherein the detection element is disposed in a pipe wall of the divided flow pipe.

9. The flow measurement device as claimed in claim 1, wherein the detection element is disposed in the flow in the divided flow pipe.

10. The flow measurement device as claimed in claim 1, wherein the detection face of the detection element is not present on the same plane as the flow passage face in the vicinity of the detection face.

11. The flow measurement device as claimed in claim 1, wherein the detection face of the detection element protrudes 0.05–0.5 mm from the flow passage face in the vicinity of the detection face.

12. The flow measurement device as claimed in claim 1, further comprising:
a support body for attaching the detection element to the divided flow pipe, wherein the detection element is supported by the support body while protruding 0.05–0.5 mm from a surface of the support body.

13. The flow measurement device as claimed in claim 1, wherein the detection element has a detection face that has a surface undulation of less than 2 $\mu$m and less than 1/25 of a height of the detecting element protruding from a level of an adjoining surface in the vicinity of the detection element.

14. The flow measurement device as claimed in claim 1, wherein the flow passage face of the divided flow pipe opposite the detection element protrudes toward the detection element so as to throttle a flow passage of the divided flow pipe.

15. The flow measurement device as claimed in claim 14, wherein the flow passage face of the divided flow pipe opposite the detection element protrudes toward the detection element in a curved face form or a polygonal shape.

16. The flow measurement device as claimed in claim 1, wherein, a flow sectional diameter of the divided flow pipe located in an upstream side of the detection element is gradually reduced from upstream toward a location of the detection element, and the flow sectional diameter located in a down stream side of the detection element is gradually increased from the location of the detection element toward further downstream of the detection element.

17. The flow measurement device as claimed in claim 16, wherein, in the vicinity of an inlet located further upstream of the element and/or an outlet port of the divided flow pipe, a stagnant portion is formed for gathering dirt or foreign substance that enters with the object flowing into the divided flow pipe by enlarging a flow passage diameter of the divided flow pipe.

18. The flow measurement device as claimed in claim 1, wherein the detection face of the detection element is exposed to a portion in the divided flow pipe where the flow is throttled to increase flow speed.

19. The flow measurement device as claimed in claim 1, wherein flow passages in an upstream side and a downstream side of the detection element are formed substantially symmetrically with the detection element being at the center.

20. The flow measurement device as claimed in claim 1, wherein the detection element and the divided flow pipe are formed as separate bodies, which are mutually detachable.

21. The flow measurement device as claimed in claim 1, wherein:
a through-window is formed in the pipe wall of the divided flow pipe;
the detection element is supported by a support body separate from the divided flow pipe while protruding 0.05–0.5 mm from the support body; and
the support body and the divided flow pipe are mutually attached such that the detection element protrudes from the through-window into the divided flow pipe.

22. The flow measurement device as claimed in claim 1, wherein:
within the divided flow pipe, a portion is formed where the flow is throttled and a portion where the flow is changed in direction; and
in a portion downstream of where the flow is throttled, the detection element is disposed in the portion where the flow is changed in direction or in the vicinity of a portion downstream of where the flow is throttled.

23. The flow measurement device as claimed in claim 1, wherein the quantity concerning the flow includes at least a flow rate and/or a flow velocity, which quantity is detected on the basis of temperature of the detection element.

24. The flow measurement device as claimed in claim 1, wherein:
the flow control means is provided in an upstream side and a downstream side of the detection element; and
the quantity concerning the flow is detected as to both of a normal flow flowing from an inlet toward an outlet of the divided flow pipe and a reverse flow flowing from the outlet toward the inlet.

25. A flow measurement device as claimed in claim 1, wherein an in-flow is inverted changing its flow direction so as to oppose its out-flow direction by turning around whereat the element inside the divided flow pipe.

26. The flow measurement device as claimed in claim 1, for application to an internal combustion engine mounted on a two-wheel vehicle.

27. A flow measurement device, comprising:
a divided flow pipe into which a flow of a detection object is introduced from a main flow pipe;
a detection element disposed at a wall portion of the divided flow pipe and which is exposed to the flow in the divided flow pipe, and detects a quantity concerning the flow; and
flow control means provided in the divided flow pipe for forming a flow that obliquely impinges against a detection face of the detection element.

28. A flow measurement device, comprising:
a divided flow pipe for introducing a flow of a detection object from a main flow pipe and taking the flow outside of the main flow pipe;
a detection element which is disposed in a portion of the divided flow pipe protruding outside the main flow pipe, and detects a quantity concerning the flow; and
flow control means which is provided in the divided flow pipe and forms a flow that obliquely impinges against a detection face of the detection element.

29. A flow measurement device, comprising:
a divided flow pipe having a flow passage face into which a flow of a detection object is introduced from a main flow pipe;
a detection element which is exposed to the flow in the divided flow pipe, and detects a quantity concerning the flow; and
flow control means provided in the divided flow pipe for forming a flow that obliquely impinges against a detection face of the detection element,
wherein the detection face protrudes at least as far as a flow passage face in the vicinity of the detection face.

30. A flow measurement device, comprising:
a divided flow pipe into which a flow of a detection object is introduced from a main flow pipe;
a detection element which is attached to the divided flow pipe via a support body so as to be exposed to the flow in the divided flow pipe, and detects a quantity concerning the flow; and
flow control means provided in the divided flow pipe for forming a flow that obliquely impinges against a detection face of the detection element,
wherein the detection element is supported by the support body such that the detection face protrudes at least as far as a surface of the support body of the detection element.

31. A flow measurement device, comprising:

a flow detection pipe and a detection element including a detection face;

means for introducing a portion of a flow in a measurement object pipe into the detection pipe; and means, provided in the detection pipe, for changing the direction of the flow introduced into the detection pipe, wherein the detection element is disposed in a wall portion of the detection pipe in which the flow introduced in the detection pipe is changed in direction and in such manner that the flow introduced into the detection pipe obliquely impinges against the detection face.

32. A flow measurement device, comprising:

a divided flow pipe into which a flow of a detection object is introduced from a main flow pipe, which has a curved portion for changing the direction of the flow introduced therein, and which has a window formed in the curved portion;

a detection element which is attached to the divided flow pipe via a support body so as to be exposed to the flow in the divided flow pipe from within the window, and detects a quantity concerning the flow; and flow control means provided in the divided flow pipe for forming a flow that obliquely impinges against a detection face of the detection element, wherein:

the support body includes a circuit board for driving or controlling the detection element; and the support body and the divided flow pipe are mutually detachable.

* * * * *